(12) United States Patent
McBride et al.

(10) Patent No.: US 8,104,274 B2
(45) Date of Patent: Jan. 31, 2012

(54) INCREASED POWER IN COMPRESSED-GAS ENERGY STORAGE AND RECOVERY

(75) Inventors: Troy O. McBride, Norwich, VT (US); Benjamin R. Bollinger, Windsor, VT (US)

(73) Assignee: SustainX, Inc., Seabrook, NH (US)

( * ) Notice: Subject to any disclaimer, the term of this patent is extended or adjusted under 35 U.S.C. 154(b) by 0 days.

(21) Appl. No.: 13/110,142

(22) Filed: May 18, 2011

(65) Prior Publication Data

US 2011/0259442 A1    Oct. 27, 2011

Related U.S. Application Data

(63) Continuation-in-part of application No. 12/794,237, filed on Jun. 4, 2010.

(60) Provisional application No. 61/405,994, filed on Oct. 22, 2010, provisional application No. 61/184,191, filed on Jun. 4, 2009, provisional application No. 61/222,286, filed on Jul. 1, 2009, provisional application No. 61/242,526, filed on Sep. 15, 2009, provisional application No. 61/256,484, filed on Oct. 30, 2009.

(51) Int. Cl.
*F04B 49/00* (2006.01)
*F15B 1/02* (2006.01)

(52) U.S. Cl. .......................................... 60/410; 60/418

(58) Field of Classification Search ............. 60/405, 60/407, 408, 410, 418, 459
See application file for complete search history.

(56) References Cited

U.S. PATENT DOCUMENTS

| | | | |
|---|---|---|---|
| 114,297 A | 5/1871 | Ivens et al. |
| 224,081 A | 2/1880 | Eckart |
| 233,432 A | 10/1880 | Pitchford |
| 1,635,524 A | 7/1927 | Aikman |
| 1,681,280 A | 8/1928 | Bruckner |
| 2,025,142 A | 12/1935 | Zahm et al. |
| 2,042,991 A | 6/1936 | Harris, Jr. |
| 2,141,703 A | 12/1938 | Bays |
| 2,280,100 A | 4/1942 | SinQleton |
| 2,280,845 A | 4/1942 | Parker |
| 2,404,660 A | 7/1946 | Rouleau |
| 2,420,098 A | 5/1947 | Rouleau |
| 2,539,862 A | 1/1951 | Rushinq |
| 2,628,564 A | 2/1953 | Jacobs |
| 2,712,728 A | 7/1955 | Lewis et al. |
| 2,813,398 A | 11/1957 | Wilcox |
| 2,829,501 A | 4/1958 | Walls |
| 2,880,759 A | 4/1959 | Wisman |
| 3,041,842 A | 7/1962 | Heinecke |

(Continued)

FOREIGN PATENT DOCUMENTS

BE    898225    3/1984

(Continued)

OTHER PUBLICATIONS

"Hydraulic Transformer Supplies Continuous High Pressure," Machine Design, Penton Media, vol. 64, No. 17, (Aug. 1992), 1 page.

(Continued)

*Primary Examiner* — Thomas E Lazo
(74) *Attorney, Agent, or Firm* — Bingham McCutchen LLP

(57) ABSTRACT

In various embodiments, energy is stored or recovered via super-atmospheric compression and/or expansion of gas in conjunction with substantially adiabatic compression and/or expansion from or to atmospheric pressure.

20 Claims, 3 Drawing Sheets

U.S. PATENT DOCUMENTS

| | | |
|---|---|---|
| 3,236,512 A | 2/1966 | Caslav et al. |
| 3,269,121 A | 8/1966 | Ludwig |
| 3,538,340 A | 11/1970 | LanQ |
| 3,608,311 A | 9/1971 | Roesel, Jr. |
| 3,648,458 A | 3/1972 | McAlister |
| 3,650,636 A | 3/1972 | Eskeli |
| 3,672,160 A | 6/1972 | Kim |
| 3,677,008 A | 7/1972 | Koutz |
| 3,704,079 A | 11/1972 | Berlyn |
| 3,757,517 A | 9/1973 | RiQollot |
| 3,793,848 A | 2/1974 | Eskeli |
| 3,801,793 A | 4/1974 | Goebel |
| 3,803,847 A | 4/1974 | McAlister |
| 3,839,863 A | 10/1974 | Frazier |
| 3,847,182 A | 11/1974 | Greer |
| 3,895,493 A | 7/1975 | Rigollot |
| 3,903,696 A | 9/1975 | Carman |
| 3,935,469 A | 1/1976 | Haydock |
| 3,939,356 A | 2/1976 | Loane |
| 3,942,323 A | 3/1976 | Maillet |
| 3,945,207 A | 3/1976 | Hyatt |
| 3,948,049 A | 4/1976 | Ohms et al. |
| 3,952,516 A | 4/1976 | Lapp |
| 3,952,723 A | 4/1976 | Browning |
| 3,958,899 A | 5/1976 | Coleman, Jr. et al. |
| 3,986,354 A | 10/1976 | Erb |
| 3,988,592 A | 10/1976 | Porter |
| 3,988,897 A | 11/1976 | Strub |
| 3,990,246 A | 11/1976 | Wilmers |
| 3,991,574 A | 11/1976 | Frazier |
| 3,996,741 A | 12/1976 | Herberg |
| 3,998,049 A | 12/1976 | McKinley et al. |
| 4,008,006 A | 2/1977 | Bea |
| 4,027,993 A | 6/1977 | Wolff |
| 4,030,303 A | 6/1977 | Kraus et al. |
| 4,031,702 A | 6/1977 | Burnett et al. |
| 4,031,704 A | 6/1977 | Moore et al. |
| 4,041,708 A * | 8/1977 | Wolff .................................. 60/649 |
| 4,050,246 A | 9/1977 | Bourquardez |
| 4,055,950 A | 11/1977 | Grossman |
| 4,058,979 A | 11/1977 | Germain |
| 4,089,744 A | 5/1978 | Cahn |
| 4,095,118 A | 6/1978 | Ratbun |
| 4,100,745 A | 7/1978 | Gyarmathy et al. |
| 4,104,955 A | 8/1978 | Murphy |
| 4,108,077 A | 8/1978 | Laing |
| 4,109,465 A | 8/1978 | Plen |
| 4,110,987 A | 9/1978 | Cahn et al. |
| 4,112,311 A | 9/1978 | Theyse |
| 4,117,342 A | 9/1978 | Melley, Jr. |
| 4,117,696 A | 10/1978 | Fawcett et al. |
| 4,118,637 A | 10/1978 | Tackett |
| 4,124,182 A | 11/1978 | Loeb |
| 4,126,000 A | 11/1978 | Funk |
| 4,136,432 A | 1/1979 | Melley, Jr. |
| 4,142,368 A | 3/1979 | Mantegani |
| 4,147,204 A | 4/1979 | Pfenninger |
| 4,149,092 A | 4/1979 | Cros |
| 4,150,547 A | 4/1979 | Hobson |
| 4,154,292 A | 5/1979 | Herrick |
| 4,167,372 A | 9/1979 | Tackett |
| 4,170,878 A | 10/1979 | Jahnig |
| 4,173,431 A | 11/1979 | Smith |
| 4,189,925 A | 2/1980 | Long |
| 4,197,700 A | 4/1980 | Jahnig |
| 4,197,715 A | 4/1980 | Fawcett et al. |
| 4,201,514 A | 5/1980 | Huetter |
| 4,204,126 A | 5/1980 | Diggs |
| 4,206,608 A | 6/1980 | Bell |
| 4,209,982 A | 7/1980 | Pitts |
| 4,220,006 A | 9/1980 | Kindt |
| 4,229,143 A | 10/1980 | Pucher |
| 4,229,661 A | 10/1980 | Mead et al. |
| 4,232,253 A | 11/1980 | Mortelmans |
| 4,237,692 A | 12/1980 | Ahrens et al. |
| 4,242,878 A | 1/1981 | Brinkerhoff |
| 4,246,978 A | 1/1981 | Schulz et al. |
| 4,262,735 A | 4/1981 | Courrege |
| 4,273,514 A | 6/1981 | Shore et al. |
| 4,274,010 A | 6/1981 | Lawson-tancred |
| 4,275,310 A | 6/1981 | Summers et al. |
| 4,281,256 A | 7/1981 | Ahrens |
| 4,293,323 A | 10/1981 | Cohen |
| 4,299,198 A | 11/1981 | Woodhull |
| 4,302,684 A | 11/1981 | Gogins |
| 4,304,103 A | 12/1981 | Hamrick |
| 4,311,011 A | 1/1982 | Lewis |
| 4,316,096 A | 2/1982 | Syverson |
| 4,317,439 A | 3/1982 | Emmerling |
| 4,335,867 A | 6/1982 | Bihlmaier |
| 4,340,822 A | 7/1982 | Gregg |
| 4,341,072 A | 7/1982 | Clyne |
| 4,348,863 A | 9/1982 | Taylor et al. |
| 4,353,214 A | 10/1982 | Gardner |
| 4,354,420 A | 10/1982 | Bianchetta |
| 4,355,956 A | 10/1982 | Ringrose et al. |
| 4,358,250 A | 11/1982 | Payne |
| 4,367,786 A | 1/1983 | Hafner et al. |
| 4,368,692 A | 1/1983 | Kita |
| 4,368,775 A | 1/1983 | Ward |
| 4,370,559 A | 1/1983 | Langley, Jr. |
| 4,372,114 A | 2/1983 | Burnham |
| 4,375,387 A | 3/1983 | deFilippi et al. |
| 4,380,419 A | 4/1983 | Morton |
| 4,393,752 A | 7/1983 | Meier |
| 4,411,136 A | 10/1983 | Funk |
| 4,421,661 A | 12/1983 | Claar et al. |
| 4,428,711 A | 1/1984 | Archer |
| 4,435,131 A | 3/1984 | Ruben |
| 4,444,011 A | 4/1984 | Kolin |
| 4,446,698 A | 5/1984 | Benson |
| 4,447,738 A | 5/1984 | Allison |
| 4,449,372 A | 5/1984 | Rilett |
| 4,452,046 A | 6/1984 | Valentin |
| 4,454,429 A | 6/1984 | Buonome |
| 4,454,720 A | 6/1984 | Leibowitz |
| 4,455,834 A | 6/1984 | Earle |
| 4,462,213 A | 7/1984 | Lewis |
| 4,474,002 A | 10/1984 | Perry |
| 4,476,851 A | 10/1984 | Brugger et al. |
| 4,478,553 A | 10/1984 | Leibowitz et al. |
| 4,489,554 A | 12/1984 | Otters |
| 4,491,739 A | 1/1985 | Watson |
| 4,492,539 A | 1/1985 | Specht |
| 4,493,189 A | 1/1985 | Slater |
| 4,496,847 A | 1/1985 | Parkings |
| 4,498,848 A | 2/1985 | Petrovsky |
| 4,502,284 A | 3/1985 | Chrisoghilos |
| 4,503,673 A | 3/1985 | Schachle |
| 4,515,516 A | 5/1985 | Perrine et al. |
| 4,520,840 A | 6/1985 | Michel |
| 4,525,631 A | 6/1985 | Allison |
| 4,530,208 A | 7/1985 | Sato |
| 4,547,209 A | 10/1985 | Netzer |
| 4,585,039 A | 4/1986 | Hamilton |
| 4,589,475 A | 5/1986 | Jones |
| 4,593,202 A | 6/1986 | Dickinson |
| 4,619,225 A | 10/1986 | Lowther |
| 4,624,623 A | 11/1986 | Wagner |
| 4,648,801 A | 3/1987 | Wilson |
| 4,651,525 A | 3/1987 | Cestero |
| 4,653,986 A | 3/1987 | Ashton |
| 4,671,742 A | 6/1987 | Gyimesi |
| 4,676,068 A | 6/1987 | Funk |
| 4,679,396 A | 7/1987 | Heggie |
| 4,691,524 A | 9/1987 | Holscher |
| 4,693,080 A | 9/1987 | Van Hooff |
| 4,706,456 A | 11/1987 | Backe |
| 4,707,988 A | 11/1987 | Palmers |
| 4,710,100 A | 12/1987 | Laing et al. |
| 4,735,552 A | 4/1988 | Watson |
| 4,739,620 A | 4/1988 | Pierce |
| 4,760,697 A | 8/1988 | Heggie |
| 4,761,118 A | 8/1988 | Zanarini |
| 4,765,142 A | 8/1988 | Nakhamkin |
| 4,765,143 A | 8/1988 | Crawford et al. |
| 4,767,938 A | 8/1988 | Bervig |

| | | | | | |
|---|---|---|---|---|---|
| 4,792,700 A | 12/1988 | Ammons | 5,819,533 A | 10/1998 | Moonen |
| 4,849,648 A | 7/1989 | Longardner | 5,819,635 A | 10/1998 | Moonen |
| 4,870,816 A | 10/1989 | Nakhamkin | 5,831,757 A | 11/1998 | DiFrancesco |
| 4,872,307 A | 10/1989 | Nakhamkin | 5,832,728 A | 11/1998 | Buck |
| 4,873,828 A | 10/1989 | Laing et al. | 5,832,906 A | 11/1998 | Douville et al. |
| 4,873,831 A | 10/1989 | Dehne | 5,839,270 A | 11/1998 | Jirnov et al. |
| 4,876,992 A | 10/1989 | Sobotowski | 5,845,479 A | 12/1998 | Nakhamkin |
| 4,877,530 A | 10/1989 | Moses | 5,873,250 A | 2/1999 | Lewis |
| 4,885,912 A | 12/1989 | Nakhamkin | 5,901,809 A | 5/1999 | Berkun |
| 4,886,534 A | 12/1989 | Castan | 5,924,283 A | 7/1999 | Burke, Jr. |
| 4,907,495 A | 3/1990 | Sugahara | 5,934,063 A | 8/1999 | Nakhamkin |
| 4,936,109 A | 6/1990 | Longardner | 5,934,076 A | 8/1999 | Coney |
| 4,942,736 A | 7/1990 | Bronicki | 5,937,652 A | 8/1999 | Abdelmalek |
| 4,955,195 A | 9/1990 | Jones et al. | 5,971,027 A | 10/1999 | Beachley et al. |
| 4,984,432 A | 1/1991 | Corey | 6,012,279 A | 1/2000 | Hines |
| 5,056,601 A | 10/1991 | Grimmer | 6,023,105 A | 2/2000 | Youssef |
| 5,058,385 A | 10/1991 | Everett, Jr. | 6,026,349 A | 2/2000 | Heneman |
| 5,062,498 A | 11/1991 | Tobias | 6,029,445 A | 2/2000 | Lech |
| 5,107,681 A | 4/1992 | Wolfbauer, III | 6,073,445 A | 6/2000 | Johnson |
| 5,133,190 A | 7/1992 | Abdelmalek | 6,073,448 A | 6/2000 | Lozada |
| 5,138,838 A | 8/1992 | Crosser | 6,085,520 A | 7/2000 | Kohno |
| 5,140,170 A | 8/1992 | Henderson | 6,090,186 A | 7/2000 | Spencer |
| 5,152,260 A | 10/1992 | Erickson et al. | 6,119,802 A | 9/2000 | Puett, Jr. |
| 5,161,449 A | 11/1992 | Everett, Jr. | 6,132,181 A | 10/2000 | Mccabe |
| 5,169,295 A | 12/1992 | Stogner et al. | 6,145,311 A | 11/2000 | Cyphelly |
| 5,182,086 A | 1/1993 | Henderson et al. | 6,148,602 A | 11/2000 | Demetri |
| 5,203,168 A | 4/1993 | Oshina | 6,153,943 A | 11/2000 | Mistr, Jr. |
| 5,209,063 A | 5/1993 | Shirai et al. | 6,158,499 A | 12/2000 | Rhodes |
| 5,213,470 A | 5/1993 | Lundquist | 6,170,443 B1 | 1/2001 | Hofbauer |
| 5,239,833 A | 8/1993 | Fineblum | 6,178,735 B1 | 1/2001 | Frutschi |
| 5,259,345 A | 11/1993 | Richeson | 6,179,446 B1 | 1/2001 | Sarmadi |
| 5,271,225 A | 12/1993 | Adamides | 6,188,182 B1 | 2/2001 | Nickols et al. |
| 5,279,206 A | 1/1994 | Krantz | 6,202,707 B1 | 3/2001 | Woodall et al. |
| 5,296,799 A | 3/1994 | Davis | 6,206,660 B1 | 3/2001 | Coney et al. |
| 5,309,713 A | 5/1994 | Vassallo | 6,210,131 B1 | 4/2001 | Whitehead |
| 5,321,946 A | 6/1994 | Abdelmalek | 6,216,462 B1 | 4/2001 | Gray, Jr. |
| 5,327,987 A | 7/1994 | Abdelmalek | 6,225,706 B1 | 5/2001 | Keller |
| 5,339,633 A | 8/1994 | Fujii et al. | 6,276,123 B1 | 8/2001 | Chen et al. |
| 5,341,644 A | 8/1994 | Nelson | 6,327,858 B1 | 12/2001 | Negre et al. |
| 5,344,627 A | 9/1994 | Fujii et al. | 6,327,994 B1 | 12/2001 | Labrador |
| 5,364,611 A | 11/1994 | Iijima et al. | 6,349,543 B1 | 2/2002 | Lisniansky |
| 5,365,980 A | 11/1994 | Deberardinis | RE37,603 E | 3/2002 | Coney |
| 5,375,417 A | 12/1994 | Barth | 6,352,576 B1 | 3/2002 | Spencer et al. |
| 5,379,589 A | 1/1995 | Cohn et al. | 6,360,535 B1 | 3/2002 | Fisher |
| 5,384,489 A | 1/1995 | Bellac | 6,367,570 B1 | 4/2002 | Long, III |
| 5,387,089 A | 2/1995 | Stogner et al. | 6,372,023 B1 | 4/2002 | Kiyono et al. |
| 5,394,693 A | 3/1995 | Plyter | 6,389,814 B2 | 5/2002 | Viteri et al. |
| 5,427,194 A | 6/1995 | Miller | 6,397,578 B2 | 6/2002 | Tsukamoto |
| 5,436,508 A | 7/1995 | Sorensen | 6,401,458 B2 | 6/2002 | Jacobson |
| 5,448,889 A | 9/1995 | Bronicki | 6,407,465 B1 | 6/2002 | Peltz et al. |
| 5,454,408 A | 10/1995 | Dibella et al. | 6,419,462 B1 | 7/2002 | Horie et al. |
| 5,454,426 A | 10/1995 | Moseley | 6,422,016 B2 | 7/2002 | Alkhamis |
| 5,467,722 A | 11/1995 | Meratla | 6,478,289 B1 | 11/2002 | Trewin |
| 5,477,677 A | 12/1995 | Krnavek | 6,512,966 B2 | 1/2003 | Lof |
| 5,491,969 A | 2/1996 | Cohn et al. | 6,513,326 B1 | 2/2003 | Maceda et al. |
| 5,491,977 A | 2/1996 | Cho | 6,516,615 B1 | 2/2003 | Stockhausen et al. |
| 5,524,821 A | 6/1996 | Vie et al. | 6,516,616 B2 | 2/2003 | Carver |
| 5,537,822 A | 7/1996 | Shnaid et al. | 6,598,392 B2 | 7/2003 | Majeres |
| 5,544,698 A | 8/1996 | Paulman | 6,598,402 B2 | 7/2003 | Kataoka et al. |
| 5,561,978 A | 10/1996 | Buschur | 6,606,860 B2 | 8/2003 | McFarland |
| 5,562,010 A | 10/1996 | McGuire | 6,612,348 B1 | 9/2003 | Wiley |
| 5,579,640 A | 12/1996 | Gray, Jr. et al. | 6,619,930 B2 | 9/2003 | Jansen et al. |
| 5,584,664 A | 12/1996 | Elliott et al. | 6,626,212 B2 | 9/2003 | Morioka et al. |
| 5,592,028 A | 1/1997 | Pritchard | 6,629,413 B1 | 10/2003 | Wendt et al. |
| 5,598,736 A | 2/1997 | Erskine | 6,637,185 B2 | 10/2003 | Hatamiya et al. |
| 5,599,172 A | 2/1997 | Mccabe | 6,652,241 B1 | 11/2003 | Alder |
| 5,600,953 A | 2/1997 | Oshita et al. | 6,652,243 B2 | 11/2003 | Krasnov |
| 5,616,007 A | 4/1997 | Cohen | 6,666,024 B1 | 12/2003 | Moskal |
| 5,634,340 A | 6/1997 | Grennan | 6,670,402 B1 | 12/2003 | Lee et al. |
| 5,641,273 A | 6/1997 | Moseley | 6,672,056 B2 | 1/2004 | Roth et al. |
| 5,674,053 A | 10/1997 | Paul et al. | 6,675,765 B2 | 1/2004 | Endoh |
| 5,685,155 A | 11/1997 | Brown | 6,688,108 B1 | 2/2004 | Van Liere |
| 5,768,893 A | 6/1998 | Hoshino et al. | 6,698,472 B2 | 3/2004 | Camacho et al. |
| 5,769,610 A | 6/1998 | Paul et al. | 6,711,984 B2 | 3/2004 | Tagge et al. |
| 5,771,693 A | 6/1998 | Coney | 6,712,166 B2 | 3/2004 | Rush et al. |
| 5,775,107 A | 7/1998 | Sparkman | 6,715,514 B2 | 4/2004 | Parker, III |
| 5,778,675 A | 7/1998 | Nakhamkin | 6,718,761 B2 | 4/2004 | Merswolke et al. |
| 5,794,442 A | 8/1998 | Lisniansky | 6,739,131 B1 | 5/2004 | Kershaw |
| 5,797,980 A | 8/1998 | Fillet | 6,739,419 B2 | 5/2004 | Jain et al. |

| | | | | | | |
|---|---|---|---|---|---|---|
| 6,745,569 B2 | 6/2004 | Gerdes | | 7,322,377 B2 | 1/2008 | Baltes |
| 6,745,801 B1 | 6/2004 | Cohen et al. | | 7,325,401 B1 | 2/2008 | Kesseli et al. |
| 6,748,737 B2 | 6/2004 | Lafferty | | 7,328,575 B2 | 2/2008 | Hedman |
| 6,762,926 B1 | 7/2004 | Shiue et al. | | 7,329,099 B2 | 2/2008 | Hartman |
| 6,786,245 B1 | 9/2004 | Eichelberger | | 7,347,049 B2 | 3/2008 | Rajendran et al. |
| 6,789,387 B2 | 9/2004 | Brinkman | | 7,353,786 B2 | 4/2008 | Scuderi et al. |
| 6,789,576 B2 | 9/2004 | Umetsu et al. | | 7,353,845 B2 | 4/2008 | Underwood et al. |
| 6,797,039 B2 | 9/2004 | Spencer | | 7,354,252 B2 | 4/2008 | Baatrup et al. |
| 6,815,840 B1 | 11/2004 | Aldendeshe | | 7,364,410 B2 | 4/2008 | Link, Jr. |
| 6,817,185 B2 | 11/2004 | Coney et al. | | 7,392,871 B2 | 7/2008 | Severinsky et al. |
| 6,834,737 B2 | 12/2004 | Bloxham | | 7,406,828 B1 | 8/2008 | Nakhamkin |
| 6,848,259 B2 | 2/2005 | Keller-sornig et al. | | 7,407,501 B2 | 8/2008 | Zvuloni |
| 6,857,450 B2 | 2/2005 | Rupp | | 7,415,835 B2 | 8/2008 | Cowans et al. |
| 6,886,326 B2 | 5/2005 | Holtzapple et al. | | 7,415,995 B2 | 8/2008 | Plummer et al. |
| 6,892,802 B2 | 5/2005 | Kelly et al. | | 7,417,331 B2 | 8/2008 | De La Torre et al. |
| 6,900,556 B2 | 5/2005 | Provanzana | | 7,418,820 B2 | 9/2008 | Harvey et al. |
| 6,922,991 B2 | 8/2005 | Polcuch | | 7,436,086 B2 | 10/2008 | Mcclintic |
| 6,925,821 B2 | 8/2005 | Sienel | | 7,441,399 B2 | 10/2008 | Utamura |
| 6,927,503 B2 | 8/2005 | Enis et al. | | 7,448,213 B2 | 11/2008 | Mitani |
| 6,931,848 B2 | 8/2005 | Maceda et al. | | 7,453,164 B2 | 11/2008 | Borden et al. |
| 6,935,096 B2 | 8/2005 | Haiun | | 7,469,527 B2 | 12/2008 | Negre et al. |
| 6,938,415 B2 | 9/2005 | Last | | 7,471,010 B1 | 12/2008 | Fingersh |
| 6,938,654 B2 | 9/2005 | Gershtein et al. | | 7,481,337 B2 | 1/2009 | Luharuka et al. |
| 6,946,017 B2 | 9/2005 | Leppin et al. | | 7,488,159 B2 | 2/2009 | Bhatt et al. |
| 6,948,328 B2 | 9/2005 | Kidwell | | 7,527,483 B1 | 5/2009 | Glauber |
| 6,952,058 B2 | 10/2005 | Mccoin | | 7,579,700 B1 | 8/2009 | Meller |
| 6,959,546 B2 | 11/2005 | Corcoran | | 7,603,970 B2 | 10/2009 | Scuderi et al. |
| 6,963,802 B2 | 11/2005 | Enis | | 7,607,503 B1 | 10/2009 | Schechter |
| 6,964,165 B2 | 11/2005 | Uhl et al. | | 7,693,402 B2 | 4/2010 | Hudson et al. |
| 6,964,176 B2 | 11/2005 | Kidwell | | 7,802,426 B2 | 9/2010 | Bollinger |
| 6,974,307 B2 | 12/2005 | Antoune et al. | | 7,827,787 B2 | 11/2010 | Cherney et al. |
| 7,000,389 B2 | 2/2006 | Lewellin | | 7,832,207 B2 | 11/2010 | McBride et al. |
| 7,007,474 B1 | 3/2006 | Ochs et al. | | 7,843,076 B2 | 11/2010 | Gogoana et al. |
| 7,017,690 B2 | 3/2006 | Burke | | 7,874,155 B2 | 1/2011 | McBride et al. |
| 7,028,934 B2 | 4/2006 | Burynski, Jr. | | 7,900,444 B1 | 3/2011 | McBride et al. |
| 7,040,083 B2 | 5/2006 | Horii et al. | | 7,958,731 B2 | 6/2011 | McBride et al. |
| 7,040,108 B1 | 5/2006 | Flammang | | 7,963,110 B2 | 6/2011 | Bollinger et al. |
| 7,040,859 B2 | 5/2006 | Kane | | 2001/0045093 A1 | 11/2001 | Jacobson |
| 7,043,920 B2 | 5/2006 | Viteri et al. | | 2003/0131599 A1 | 7/2003 | Gerdes |
| 7,047,744 B1 | 5/2006 | Robertson et al. | | 2003/0145589 A1 | 8/2003 | Tillyer |
| 7,055,325 B2 | 6/2006 | Wolken | | 2003/0177767 A1 | 9/2003 | Keller-sornig et al. |
| 7,067,937 B2 | 6/2006 | Enish et al. | | 2003/0180155 A1 | 9/2003 | Coney et al. |
| 7,075,189 B2 | 7/2006 | Heronemus | | 2004/0050042 A1 | 3/2004 | Frazer |
| RE39,249 E | 8/2006 | Link, Jr. | | 2004/0050049 A1 | 3/2004 | Wendt et al. |
| 7,084,520 B2 | 8/2006 | Zambrano | | 2004/0146406 A1 | 7/2004 | Last |
| 7,086,231 B2 | 8/2006 | Pinkerton | | 2004/0146408 A1 | 7/2004 | Anderson |
| 7,093,450 B2 | 8/2006 | Jimenez Haertel et al. | | 2004/0148934 A1 | 8/2004 | Pinkerton et al. |
| 7,093,626 B2 | 8/2006 | Li et al. | | 2004/0211182 A1 | 10/2004 | Gould |
| 7,098,552 B2 | 8/2006 | Mccoin | | 2004/0244580 A1 | 12/2004 | Coney et al. |
| 7,107,766 B2 | 9/2006 | Zacche' et al. | | 2004/0261415 A1 | 12/2004 | Negre et al. |
| 7,107,767 B2 | 9/2006 | Frazer et al. | | 2005/0016165 A1 | 1/2005 | Enis et al. |
| 7,116,006 B2 | 10/2006 | Mccoin | | 2005/0028529 A1 | 2/2005 | Bartlett et al. |
| 7,124,576 B2 | 10/2006 | Cherney et al. | | 2005/0047930 A1 | 3/2005 | Schmid |
| 7,124,586 B2 | 10/2006 | Negre et al. | | 2005/0072154 A1 | 4/2005 | Frutschi |
| 7,127,895 B2 | 10/2006 | Pinkerton et al. | | 2005/0115234 A1 | 6/2005 | Asano et al. |
| 7,128,777 B2 | 10/2006 | Spencer | | 2005/0155347 A1 | 7/2005 | Lewellin |
| 7,134,279 B2 | 11/2006 | White | | 2005/0166592 A1 | 8/2005 | Larson et al. |
| 7,155,912 B2 | 1/2007 | Enis et al. | | 2005/0274334 A1 | 12/2005 | Warren |
| 7,168,928 B1 | 1/2007 | West | | 2005/0275225 A1 | 12/2005 | Bertolotti |
| 7,168,929 B2 | 1/2007 | Siegel et al. | | 2005/0279086 A1 | 12/2005 | Hoos |
| 7,169,489 B2 | 1/2007 | Redmond | | 2005/0279292 A1 | 12/2005 | Hudson et al. |
| 7,177,751 B2 | 2/2007 | Froloff | | 2006/0055175 A1 | 3/2006 | Grinblat |
| 7,178,337 B2 | 2/2007 | Pflanz | | 2006/0059936 A1 | 3/2006 | Radke et al. |
| 7,191,603 B2 | 3/2007 | Taube | | 2006/0059937 A1 | 3/2006 | Perkins et al. |
| 7,197,871 B2 | 4/2007 | Yoshino | | 2006/0075749 A1 | 4/2006 | Cherney et al. |
| 7,201,095 B2 | 4/2007 | Hughey | | 2006/0090467 A1 | 5/2006 | Crow |
| 7,218,009 B2 | 5/2007 | Hendrickson et al. | | 2006/0090477 A1 | 5/2006 | Rolff |
| 7,219,779 B2 | 5/2007 | Bauer et al. | | 2006/0107664 A1 | 5/2006 | Hudson et al. |
| 7,225,762 B2 | 6/2007 | Mahlanen | | 2006/0162543 A1 | 7/2006 | Abe et al. |
| 7,228,690 B2 | 6/2007 | Barker | | 2006/0162910 A1 | 7/2006 | Kelly et al. |
| 7,230,348 B2 | 6/2007 | Poole | | 2006/0175337 A1 | 8/2006 | Defosset |
| 7,231,998 B1 | 6/2007 | Schechter | | 2006/0201148 A1 | 9/2006 | Zabtcioglu |
| 7,240,812 B2 | 7/2007 | Kamikozuru | | 2006/0248886 A1 | 11/2006 | Ma |
| 7,249,617 B2 | 7/2007 | Musselman et al. | | 2006/0248892 A1 | 11/2006 | Ingersoll |
| 7,254,944 B1 | 8/2007 | Goetzinger et al. | | 2006/0254281 A1 | 11/2006 | Badeer et al. |
| 7,273,122 B2 | 9/2007 | Rose | | 2006/0260311 A1 | 11/2006 | Ingersoll |
| 7,281,371 B1 | 10/2007 | Heidenreich | | 2006/0260312 A1 | 11/2006 | Ingersoll |
| 7,308,361 B2 | 12/2007 | Enis et al. | | 2006/0262465 A1 | 11/2006 | Wiederhold |
| 7,317,261 B2 | 1/2008 | Rolt | | 2006/0266034 A1 | 11/2006 | Ingersoll |

| | | |
|---|---|---|
| 2006/0266035 A1 | 11/2006 | Ingersoll et al. |
| 2006/0266036 A1 | 11/2006 | Ingersoll |
| 2006/0266037 A1 | 11/2006 | Ingersoll |
| 2006/0280993 A1 | 12/2006 | Keefer et al. |
| 2006/0283967 A1 | 12/2006 | Cho et al. |
| 2007/0006586 A1 | 1/2007 | Hoffman et al. |
| 2007/0022754 A1 | 2/2007 | Perkins et al. |
| 2007/0022755 A1 | 2/2007 | Pinkerton et al. |
| 2007/0062194 A1 | 3/2007 | Ingersoll |
| 2007/0074533 A1 | 4/2007 | Hugenroth et al. |
| 2007/0095069 A1 | 5/2007 | Joshi et al. |
| 2007/0113803 A1 | 5/2007 | Froloff et al. |
| 2007/0116572 A1 | 5/2007 | Barbu et al. |
| 2007/0137595 A1 | 6/2007 | Greenwell |
| 2007/0151528 A1 | 7/2007 | Hedman |
| 2007/0158946 A1 | 7/2007 | Annen et al. |
| 2007/0181199 A1 | 8/2007 | Weber |
| 2007/0182160 A1 | 8/2007 | Enis et al. |
| 2007/0205298 A1 | 9/2007 | Harrison et al. |
| 2007/0234749 A1 | 10/2007 | Enis et al. |
| 2007/0243066 A1 | 10/2007 | Baron |
| 2007/0245735 A1 | 10/2007 | Ashikian |
| 2007/0258834 A1 | 11/2007 | Froloff et al. |
| 2008/0000436 A1 | 1/2008 | Goldman |
| 2008/0016868 A1 | 1/2008 | Ochs et al. |
| 2008/0047272 A1 | 2/2008 | Schoell |
| 2008/0050234 A1 | 2/2008 | Ingersoll et al. |
| 2008/0072870 A1 | 3/2008 | Chomyszak et al. |
| 2008/0087165 A1 | 4/2008 | Wright et al. |
| 2008/0104939 A1 | 5/2008 | Hoffmann et al. |
| 2008/0112807 A1 | 5/2008 | Uphues et al. |
| 2008/0127632 A1 | 6/2008 | Finkenrath et al. |
| 2008/0138265 A1 | 6/2008 | Lackner et al. |
| 2008/0155975 A1 | 7/2008 | Brinkman |
| 2008/0155976 A1 | 7/2008 | Smith et al. |
| 2008/0157528 A1 | 7/2008 | Wang et al. |
| 2008/0157537 A1 | 7/2008 | Richard |
| 2008/0164449 A1 | 7/2008 | Gray et al. |
| 2008/0185194 A1 | 8/2008 | Leone |
| 2008/0202120 A1 | 8/2008 | Karyambas |
| 2008/0211230 A1 | 9/2008 | Gurin |
| 2008/0228323 A1 | 9/2008 | Laumer et al. |
| 2008/0233029 A1 | 9/2008 | Fan et al. |
| 2008/0238105 A1 | 10/2008 | Ortiz et al. |
| 2008/0238187 A1 | 10/2008 | Garnett et al. |
| 2008/0250788 A1 | 10/2008 | Nuel et al. |
| 2008/0251302 A1 | 10/2008 | Lynn et al. |
| 2008/0272597 A1 | 11/2008 | Althaus |
| 2008/0272598 A1 | 11/2008 | Nakhamkin |
| 2008/0272605 A1 | 11/2008 | Borden et al. |
| 2008/0308168 A1 | 12/2008 | O'Brien, II et al. |
| 2008/0308270 A1 | 12/2008 | Wilson |
| 2008/0315589 A1 | 12/2008 | Malmrup |
| 2009/0000290 A1 | 1/2009 | Brinkman |
| 2009/0007558 A1 | 1/2009 | Hall et al. |
| 2009/0008173 A1 | 1/2009 | Hall et al. |
| 2009/0010772 A1 | 1/2009 | Siemroth |
| 2009/0020275 A1 | 1/2009 | Neher et al. |
| 2009/0021012 A1 | 1/2009 | Stull et al. |
| 2009/0056331 A1 | 3/2009 | Zhao et al. |
| 2009/0071153 A1 | 3/2009 | Boyapati et al. |
| 2009/0107784 A1 | 4/2009 | Gabriel et al. |
| 2009/0145130 A1 | 6/2009 | Kaufman |
| 2009/0158740 A1 | 6/2009 | Littau et al. |
| 2009/0178409 A1 | 7/2009 | Shinnar |
| 2009/0200805 A1 | 8/2009 | Kim et al. |
| 2009/0220364 A1 | 9/2009 | Rigal et al. |
| 2009/0229902 A1 | 9/2009 | Stansbury, III |
| 2009/0249826 A1 | 10/2009 | Hugelman |
| 2009/0282822 A1 | 11/2009 | McBride et al. |
| 2009/0282840 A1 | 11/2009 | Chen et al. |
| 2009/0294096 A1 | 12/2009 | Mills et al. |
| 2009/0301089 A1 | 12/2009 | Bollinger |
| 2009/0317267 A1 | 12/2009 | Gill et al. |
| 2009/0322090 A1 | 12/2009 | Wolf |
| 2010/0018196 A1 | 1/2010 | Li et al. |
| 2010/0077765 A1 | 4/2010 | Japikse |
| 2010/0089063 A1 | 4/2010 | McBride et al. |
| 2010/0133903 A1 | 6/2010 | Rufer |
| 2010/0139277 A1 | 6/2010 | McBride et al. |
| 2010/0193270 A1 | 8/2010 | Deshaies et al. |
| 2010/0199652 A1 | 8/2010 | Lemofouet et al. |
| 2010/0205960 A1 | 8/2010 | McBride et al. |
| 2010/0229544 A1 | 9/2010 | Bollinger et al. |
| 2010/0307156 A1 | 12/2010 | Bollinger |
| 2010/0326062 A1 | 12/2010 | Fong et al. |
| 2010/0326064 A1 | 12/2010 | Fong et al. |
| 2010/0326066 A1 | 12/2010 | Fong et al. |
| 2010/0326068 A1 | 12/2010 | Fong et al. |
| 2010/0326069 A1 | 12/2010 | Fong et al. |
| 2010/0326075 A1 | 12/2010 | Fong et al. |
| 2010/0329891 A1 | 12/2010 | Fong et al. |
| 2010/0329903 A1 | 12/2010 | Fong et al. |
| 2010/0329909 A1 | 12/2010 | Fong et al. |
| 2011/0023488 A1 | 2/2011 | Fong et al. |
| 2011/0023977 A1 | 2/2011 | Fong et al. |
| 2011/0030359 A1 | 2/2011 | Fong et al. |
| 2011/0030552 A1 | 2/2011 | Fong et al. |
| 2011/0056193 A1 | 3/2011 | McBride et al. |
| 2011/0056368 A1 | 3/2011 | McBride et al. |
| 2011/0061741 A1 | 3/2011 | Ingersoll et al. |
| 2011/0061836 A1 | 3/2011 | Ingersoll et al. |
| 2011/0062166 A1 | 3/2011 | Ingersoll et al. |
| 2011/0107755 A1 | 5/2011 | McBride et al. |
| 2011/0115223 A1 | 5/2011 | Stahlkopf et al. |
| 2011/0131966 A1 | 6/2011 | McBride et al. |
| 2011/0138797 A1 | 6/2011 | Bollinger et al. |
| 2011/0167813 A1 | 7/2011 | McBride et al. |
| 2011/0204064 A1 | 8/2011 | Crane et al. |
| 2011/0219760 A1 | 9/2011 | McBride et al. |
| 2011/0219763 A1 | 9/2011 | McBride et al. |
| 2011/0232281 A1 | 9/2011 | McBride et al. |
| 2011/0233934 A1 | 9/2011 | Crane et al. |

FOREIGN PATENT DOCUMENTS

| | | |
|---|---|---|
| BE | 1008885 | 8/1996 |
| CN | 1061262 | 5/1992 |
| CN | 1171490 | 1/1998 |
| CN | 1276308 | 12/2000 |
| CN | 1277323 | 12/2000 |
| CN | 1412443 | 4/2003 |
| CN | 1743665 | 3/2006 |
| CN | 2821162 | 9/2006 |
| CN | 2828319 | 10/2006 |
| CN | 2828368 | 10/2006 |
| CN | 1884822 | 12/2006 |
| CN | 1888328 | 1/2007 |
| CN | 1967091 | 5/2007 |
| CN | 101033731 | 9/2007 |
| CN | 101042115 | 9/2007 |
| CN | 101070822 | 11/2007 |
| CN | 101149002 | 3/2008 |
| CN | 101162073 | 4/2008 |
| CN | 201103518 | 8/2008 |
| CN | 201106527 | 8/2008 |
| CN | 101289963 | 10/2008 |
| CN | 201125855 | 10/2008 |
| CN | 101377190 | 4/2009 |
| CN | 101408213 | 4/2009 |
| CN | 101435451 | 5/2009 |
| DE | 25 38 870 | 6/1977 |
| DE | 19530253 | 11/1996 |
| DE | 19903907 | 8/2000 |
| DE | 19911534 | 9/2000 |
| DE | 10042020 | 5/2001 |
| DE | 20118183 | 3/2003 |
| DE | 20120330 | 4/2003 |
| DE | 10147940 | 5/2003 |
| DE | 10205733 | 8/2003 |
| DE | 10212480 | 10/2003 |
| DE | 20312293 | 12/2003 |
| DE | 10220499 | 4/2004 |
| DE | 10334637 | 2/2005 |
| DE | 10 2005 047622 | 4/2007 |
| EP | 0204748 | 3/1981 |
| EP | 0091801 | 10/1983 |
| EP | 0097002 | 12/1983 |
| EP | 0196690 | 10/1986 |

| | | | | | |
|---|---|---|---|---|---|
| EP | 0212692 | 3/1987 | WO | WO-98/02818 | 1/1998 |
| EP | 0364106 | 4/1990 | WO | WO-98/17492 | 4/1998 |
| EP | 0507395 | 10/1992 | WO | WO-00/01945 | 1/2000 |
| EP | 0821162 | 1/1998 | WO | WO-00/37800 | 6/2000 |
| EP | 0 857 877 | 8/1998 | WO | WO-00/65212 | 11/2000 |
| EP | 1 388 442 | 2/2004 | WO | WO-00/68578 | 11/2000 |
| EP | 1405662 | 4/2004 | WO | WO 0175290 | 10/2001 |
| EP | 1657452 | 11/2004 | WO | WO-02/25083 | 3/2002 |
| EP | 1726350 | 11/2006 | WO | WO-02/46621 | 6/2002 |
| EP | 1741899 | 1/2007 | WO | WO-02/103200 | 12/2002 |
| EP | 1 780 058 | 5/2007 | WO | WO-03021702 | 3/2003 |
| EP | 1988294 | 11/2008 | WO | WO-03/078812 | 9/2003 |
| EP | 2014896 | 1/2009 | WO | WO-03/081011 | 10/2003 |
| EP | 2078857 | 7/2009 | WO | WO-2004/034391 | 5/2004 |
| FR | 2449805 | 9/1980 | WO | WO-2004/059155 | 7/2004 |
| FR | 2816993 | 5/2002 | WO | WO-2004/072452 | 8/2004 |
| FR | 2829805 | 3/2003 | WO | WO-2004/074679 | 9/2004 |
| GB | 722524 | 11/1951 | WO | WO-2004/109172 | 12/2004 |
| GB | 772703 | 4/1957 | WO | WO-2005/044424 | 5/2005 |
| GB | 1449076 | 9/1976 | WO | WO-2005/062969 | 7/2005 |
| GB | 1479940 | 7/1977 | WO | WO-2005/067373 | 7/2005 |
| GB | 2106992 | 4/1983 | WO | WO-2005/079461 | 9/2005 |
| GB | 2223810 | 4/1990 | WO | WO-2005/088131 | 9/2005 |
| GB | 2 300 673 | 11/1996 | WO | WO-2005/095155 | 10/2005 |
| GB | 2373546 | 9/2002 | WO | WO-2006/029633 | 3/2006 |
| GB | 2403356 | 12/2004 | WO | WO-2006/058085 | 6/2006 |
| JP | 57010778 | 1/1982 | WO | WO-2006/124006 | 11/2006 |
| JP | 57070970 | 5/1982 | WO | WO-2007/002094 | 1/2007 |
| JP | 57120058 | 7/1982 | WO | WO-2007/003954 | 1/2007 |
| JP | 58183880 | 10/1982 | WO | WO-2007/012143 | 2/2007 |
| JP | 58150079 | 9/1983 | WO | WO-2007/035997 | 4/2007 |
| JP | 58192976 | 11/1983 | WO | WO-2007/051034 | 5/2007 |
| JP | 60206985 | 10/1985 | WO | WO-2007/066117 | 6/2007 |
| JP | 62101900 | 5/1987 | WO | WO-2007/086792 | 8/2007 |
| JP | 63227973 | 9/1988 | WO | WO-2007/089872 | 8/2007 |
| JP | 2075674 | 3/1990 | WO | WO-2007/096656 | 8/2007 |
| JP | 2247469 | 10/1990 | WO | WO-2007/111839 | 10/2007 |
| JP | 3009090 | 1/1991 | WO | WO-2007/136765 | 11/2007 |
| JP | 3281984 | 12/1991 | WO | WO-2007140914 | 12/2007 |
| JP | 4121424 | 4/1992 | WO | WO-2008/003950 | 1/2008 |
| JP | 6185450 | 7/1994 | WO | WO-2008/014769 | 2/2008 |
| JP | 8145488 | 6/1996 | WO | WO-2008023901 | 2/2008 |
| JP | 9166079 | 6/1997 | WO | WO-2008/027259 | 3/2008 |
| JP | 10313547 | 11/1998 | WO | WO-2008/028881 | 3/2008 |
| JP | 2000-346093 | 6/1999 | WO | WO-2008/039725 | 4/2008 |
| JP | 11351125 | 12/1999 | WO | WO-2008/045468 | 4/2008 |
| JP | 2000166128 | 6/2000 | WO | WO-2008045468 | 4/2008 |
| JP | 2000346093 | 12/2000 | WO | WO-2008/051427 | 5/2008 |
| JP | 2002127902 | 5/2002 | WO | WO-2008/074075 | 6/2008 |
| JP | 2003083230 | 3/2003 | WO | WO-2008/084507 | 7/2008 |
| JP | 2005023918 | 1/2005 | WO | WO-2008/091373 | 7/2008 |
| JP | 2005036769 | 2/2005 | WO | WO 2008102292 | 8/2008 |
| JP | 2005068963 | 3/2005 | WO | WO-2008/106967 | 9/2008 |
| JP | 2006220252 | 8/2006 | WO | WO-2008/108870 | 9/2008 |
| JP | 2007001872 | 1/2007 | WO | WO-2008/109006 | 9/2008 |
| JP | 2007145251 | 6/2007 | WO | WO-2008/110018 | 9/2008 |
| JP | 2007211730 | 8/2007 | WO | WO-2008/115479 | 9/2008 |
| JP | 2008038658 | 2/2008 | WO | WO-2008/121378 | 10/2008 |
| KR | 840000180 | 2/1984 | WO | WO-2008139267 | 11/2008 |
| KR | 2004004637 | 1/2004 | WO | WO-2008/152432 | 12/2008 |
| RU | 2101562 | 1/1998 | WO | WO-2008/153591 | 12/2008 |
| RU | 2169857 | 6/2001 | WO | WO-2008/157327 | 12/2008 |
| RU | 2213255 | 9/2003 | WO | WO-2009/034548 | 3/2009 |
| SU | 800438 | 1/1981 | WO | WO-2009/038973 | 3/2009 |
| UA | 69030 | 8/2004 | WO | WO-2009034421 | 3/2009 |
| WO | WO-82/00319 | 2/1982 | WO | WO-2009/045110 | 4/2009 |
| WO | WO-8802818 | 4/1988 | WO | WO-2009044139 | 4/2009 |
| WO | WO-99/41498 | 8/1990 | WO | WO-2009/114205 | 9/2009 |
| WO | WO-92/22741 | 12/1992 | WO | WO-2009/126784 | 10/2009 |
| WO | WO-93/06367 | 4/1993 | WO | WO-2010/006319 | 1/2010 |
| WO | WO-93/11363 | 6/1993 | WO | WO-2010/009053 | 1/2010 |
| WO | WO-93/24754 | 12/1993 | WO | WO-2010/040890 | 4/2010 |
| WO | WO 9412785 | 6/1994 | WO | WO-2010/105155 | 9/2010 |
| WO | WO-95/25381 | 9/1995 | WO | WO-2010/135658 | 11/2010 |
| WO | WO-96/01942 | 1/1996 | WO | WO-2011/008321 | 1/2011 |
| WO | WO-96/22456 | 7/1996 | WO | WO-2011/008325 | 1/2011 |
| WO | WO-96/34213 | 10/1996 | WO | WO-2011/008500 | 1/2011 |
| WO | WO-97/01029 | 1/1997 | WO | WO-2011/079267 | 6/2011 |
| WO | WO-97/17546 | 5/1997 | WO | WO-2011/079271 | 6/2011 |

OTHER PUBLICATIONS

Lemofouet, "Investigation and Optimisation of Hybrid Electricity Storage Systems Based on Compressed Air and Supercapacitors," (Oct. 20, 2006), 250 pages.

Cyphelly et al., "Usage of Compressed Air Storage Systems," BFE-Program "Electricity," Final Report, May 2004, 14 pages.

Lemofouet et al., "A Hybrid Energy Storage System Based on Compressed Air and Supercapacitors with Maximum Efficiency Point Tracking (MEPT)," IEEE Transactions on Industrial Electron, vol. 53, No. 4, (Aug. 2006) pp. 1105-1115.

International Search Report and Written Opinion issued Sep. 15, 2009 for International Application No. PCT/US2009/040027, 8 pages.

International Search Report and Written Opinion issued Aug. 30, 2010 for International Application No. PCT/US2010/029795, 9 pages.

International Search Report and Written Opinion issued Dec. 3, 2009 for International Application No. PCT/US2009/046725, 9 pages.

International Search Report and Written Opinion issued Jan. 4, 2011 for International Application No. PCT/US2010/055279, 13 pages.

International Search Report and Written Opinion mailed May 25, 2011 for International Application No. PCT/US2010/027138, 12 pages.

Rufer et al., "Energetic Performance of a Hybrid Energy Storage System Based on Compressed Air and Super Capacitors," Power Electronics, Electrical Drives, Automation and Motion, (May 1, 2006), pp. 469-474.

Lemofouet et al. "Hybrid Energy Storage Systems based on Compressed Air and Supercapacitors with Maximum Efficiency Point Tracking," Industrial Electronics Laboratory (LEI), (2005), pp. 1-10.

Lemofouet et al. "Hybrid Energy Storage Systems based on Compressed Air and Supercapacitors with Maximum Efficiency Point Tracking," The International Power Electronics Conference, (2005), pp. 461-468.

* cited by examiner

INCREASED POWER IN COMPRESSED-GAS ENERGY STORAGE AND RECOVERY

RELATED APPLICATIONS

This application claims the benefit of and priority to U.S. Provisional Patent Application No. 61/405,994, filed Oct. 22, 2010, and is a continuation-in-part of U.S. patent application Ser. No. 12/794,237, filed on Jun. 4, 2010, which claims the benefit of and priority to U.S. Provisional Patent Application Serial Nos. 61/184,191, filed on Jun. 4, 2009; 61/222,286, filed on Jul. 1, 2009; 61/242,526, filed on Sep. 15, 2009; and 61/256,484, filed on Oct. 30, 2009. The entire disclosure of each of these references is hereby incorporated herein by reference.

STATEMENT REGARDING FEDERALLY SPONSORED RESEARCH

This invention was made with government support under IIP-0923633 awarded by the NSF and DE-OE0000231 awarded by the DOE. The government has certain rights in the invention.

FIELD OF THE INVENTION

In various embodiments, the present invention relates to pneumatics, power generation, and energy storage, and more particularly, to compressed-gas energy-storage systems and methods using pneumatic or pneumatic/hydraulic cylinders.

BACKGROUND

Storing energy in the form of compressed gas has a long history and components tend to be well tested and reliable, and have long lifetimes. The general principle of compressed-gas or compressed-air energy storage (CAES) is that generated energy (e.g., electric energy) is used to compress gas (e.g., air), thus converting the original energy to pressure potential energy; this potential energy is later recovered in a useful form (e.g., converted back to electricity) via gas expansion coupled to an appropriate mechanism. Advantages of compressed-gas energy storage include low specific-energy costs, long lifetime, low maintenance, reasonable energy density, and good reliability.

If a body of gas is at the same temperature as its environment, and expansion occurs slowly relative to the rate of heat exchange between the gas and its environment, then the gas will remain at approximately constant temperature as it expands. This process is termed "isothermal" expansion. Isothermal expansion of a quantity of gas stored at a given temperature recovers approximately three times more work than would "adiabatic expansion," that is, expansion where no heat is exchanged between the gas and its environment—e.g., because the expansion happens rapidly or in an insulated chamber. Gas may also be compressed isothermally or adiabatically.

An ideally isothermal energy-storage cycle of compression, storage, and expansion would have 100% thermodynamic efficiency. An ideally adiabatic energy-storage cycle would also have 100% thermodynamic efficiency, but there are many practical disadvantages to the adiabatic approach. These include the production of higher temperature and pressure extremes within the system, heat loss during the storage period, and inability to exploit environmental (e.g., cogenerative) heat sources and sinks during expansion and compression, respectively. In an isothermal system, the cost of adding a heat-exchange system is traded against resolving the difficulties of the adiabatic approach. In either case, mechanical energy from expanding gas must usually be converted to electrical energy before use.

An efficient and novel design for storing energy in the form of compressed gas utilizing near isothermal gas compression and expansion has been shown and described in U.S. Pat. No. 7,832,207 (the '207 patent) and U.S. patent application Ser. No. 12/639,703 (the '703 application), the disclosures of which are hereby incorporated herein by reference in their entireties. The '207 patent and the '703 application disclose systems and methods for expanding gas isothermally in staged cylinders and intensifiers over a large pressure range in order to generate electrical energy when required. Mechanical energy from the expanding gas may be used to drive a hydraulic pump/motor subsystem that produces electricity. Systems and methods for hydraulic-pneumatic pressure intensification that may be employed in systems and methods such as those disclosed in the '207 patent and the '703 application are shown and described in U.S. patent application Ser. No. 12/879,595 (the '595 application), the disclosure of which is hereby incorporated herein by reference in its entirety.

In the systems disclosed in the '207 patent and the '703 application, reciprocal mechanical motion is produced during recovery of energy from storage by expansion of gas in the cylinders. This reciprocal motion may be converted to electricity by a variety of means, for example as disclosed in the '595 application as well as in U.S. patent application Ser. No. 12/938,853 (the '853 application), the disclosure of which is hereby incorporated herein by reference in its entirety. The ability of such systems to either store energy (i.e., use energy to compress gas into a storage reservoir) or produce energy (i.e., expand gas from a storage reservoir to release energy) will be apparent to any person reasonably familiar with the principles of electrical and pneumatic machines.

As mentioned above, compressed-gas energy storage and recovery systems are typically designed to compress and/or expand gas completely isothermally in order to maximize efficiency. Furthermore, such systems typically compress gas from atmospheric pressure and expand gas back down to atmospheric pressure in order to maximize the stored-energy density. However, opportunities exist to increase the power output of compressed-air energy storage and recovery systems. Furthermore, in order to increase reliability of such systems, it would be advantageous to decrease the full range of force experienced and exerted by the components of the system.

SUMMARY

Embodiments of the present invention achieve higher power levels and a narrower force range for energy storage systems using compression and expansion of gas within one or more groups of pneumatic cylinders (herein, "pneumatic cylinders" may refer to cylinders having only pneumatic compartments, or to pneumatic compartments of other cylinders, e.g., pneumatic/hydraulic cylinders). The higher power levels and a narrower range of force are generally achieved by introduction of a pre-compression stage in which the starting pressure within the first pneumatic cylinder is increased above atmospheric pressure. Likewise, higher power levels and a narrower force range during expansion are achieved by introduction of a post-expansion phase in which the final pressure within the last pneumatic cylinder in the group is above atmospheric pressure. In various embodiments, potential energy still present in the super-atmospheric-pressure gas in the last pneumatic cylinder may be recovered via a post-expansion stage during which the gas is used to drive a turbine or other expander device. Since the pre-compression and post-expansion stages are typically substantially adiabatic (so that any substantially isothermal compression and expansion are, as a result, performed over a pressure range not extending all the way to atmospheric pressure), embodiments of the invention contradict conventional wisdom by sacrificing a portion of the efficiency achieved in a completely isothermal system in favor of increased power output and narrower range of force.

Embodiments of the present invention are typically utilized in energy storage and generation systems utilizing compressed gas. In a compressed-gas energy storage system, gas is stored at high pressure (e.g., approximately 3,000 pounds per square inch (psi)). This gas may be expanded into a cylinder having a first compartment (or "chamber") and a second compartment separated by a piston slidably disposed within the cylinder (or other boundary mechanism). A shaft may be coupled to the piston and extend through the first compartment and/or the second compartment of the cylinder and beyond an end cap of the cylinder, and a transmission mechanism may be coupled to the shaft for converting a reciprocal motion of the shaft into a rotary motion, as described in the '595 and '853 applications. Moreover, a motor/generator may be coupled to the transmission mechanism. Alternatively or additionally, the shaft of the cylinders may be coupled to one or more linear generators, as described in the '853 application.

In addition, energy storage and generation systems in accordance with embodiments of the invention may include a heat-transfer subsystem for expediting heat transfer in the first compartment and/or the second compartment of the pneumatic cylinder assembly. In one embodiment, the heat-transfer subsystem includes a fluid circulator and a heat-transfer fluid reservoir as described in the '703 application. The fluid circulator pumps a heat-transfer fluid into the first compartment and/or the second compartment of the pneumatic cylinder. The heat-transfer subsystem may also include a spray mechanism, disposed in the first compartment and/or the second compartment, for introducing the heat-transfer fluid. In various embodiments, the spray mechanism is a spray head and/or a spray rod.

In accordance with embodiments of the invention, gas compression or expansion occurs in the energy storage and generation system in multiple stages using low- and high-pressure cylinders. For example, during expansion, gas is expanded in a high-pressure cylinder from a high initial pressure (e.g., approximately 3,000 pounds per square inch gauge (psig)) to a medium pressure (e.g. approximately 300 psig); then, this mid-pressure gas is expanded further (e.g., approximately 300 psig to approximately 30 psig) in a separate low-pressure cylinder. These two expansion stages may be coupled mechanically by various means as described in the '595 and '853 applications. In each cylinder where gas is being expanded, the piston slidably disposed within the cylinder moves to enlarge the cylinder chamber containing the expanding gas. When each piston reaches the limit of its range of motion, valves or other mechanisms may be adjusted to direct gas to the appropriate chambers of the cylinder to reverse its direction of action, whereupon a new expansion stroke may be performed. In double-acting devices of this type, there is no withdrawal stroke or unpowered stroke. Rather, the stroke is powered in both directions.

Gas undergoing expansion tends to cool, while gas undergoing compression tends to heat. To maximize efficiency (i.e., the fraction of elastic potential energy in the compressed gas that is converted to work, or vice versa), gas expansion and compression should be as near isothermal (i.e., constant-temperature) as possible. Several ways of approximating isothermal expansion and compression may be employed.

First, as described in U.S. Pat. No 7,802,426 (the '426 patent), the disclosure of which is hereby incorporated by reference herein in its entirety, gas undergoing either compression or expansion may be directed, continuously or in installments, through a heat-exchange subsystem external to the cylinder. The heat-exchange subsystem either rejects heat to the environment (to cool gas undergoing compression) or absorbs heat from the environment (to warm gas undergoing expansion). An isothermal process may be approximated via judicious selection of this heat-exchange rate.

Additionally, as described in the '703 application, droplets of a liquid (e.g., water) may be sprayed into a chamber of the cylinder in which gas is presently undergoing compression (or expansion) in order to transfer heat to or from the gas. As the liquid droplets exchange heat with the gas around them, the temperature of the gas is raised or lowered; the temperature of the droplets is also raised or lowered. The liquid is evacuated from the cylinder through a suitable mechanism. The heat-exchange spray droplets may be introduced through a spray head (in, e.g., a vertical cylinder), through a spray rod arranged coaxially with the cylinder piston (in, e.g., a horizontal cylinder), or by any other mechanism that permits formation of a liquid spay within the cylinder. Droplets may be used to either warm gas undergoing expansion or to cool gas undergoing compression. Again, an isothermal process may be approximated via judicious selection of this heat-exchange rate.

A further opportunity for increased efficiency arises from the fact that as gas in the high-pressure storage vessel is exhausted, its pressure decreases. Thus, in order to extract as much energy as possible from a given quantity of stored gas, the electricity-producing side of the energy-storage system typically operates over a wide range of input pressures, i.e., from the reservoir's high-pressure limit (e.g., approximately 3,000 psig) to as close to atmospheric as possible. At lower pressure, gas expanding in a cylinder will exert a smaller force on its piston and thus, ultimately, on the rotor of any generator to which it is coupled. For a fixed rotor speed, this will generally result in reduced power output.

At the same time, the range of torque (i.e., force) applied to the shaft of a motor/generator, and thus the range of resulting shaft rotational speeds, is generally minimized in order to achieve maximum motor/generator efficiency. In lieu of more complicated linkages, for a given operating pressure range (e.g., approximately 2,500 psig to approximately 1 psig), the range of torques experienced at the motor/generator may be reduced through the addition of multiple, in-series cylinder stages. That is, as gas from the high-pressure reservoir is expanded in one chamber of an initial, high-pressure cylinder, gas from the other chamber of the high-pressure cylinder is directed to the expansion chamber of a second, lower-pressure cylinder. Gas from the lower-pressure chamber of this second cylinder may either be vented to the environment or directed to the expansion chamber of a third cylinder operating at still lower pressure, and so on.

The principle may be extended to two or more cylinders to suit particular applications. For example, a narrower output force range for a given range of reservoir pressures is achieved by having a first, high-pressure cylinder operating between approximately 3,000 psig and approximately 300 psig and a second, larger-volume, lower-pressure cylinder operating between approximately 300 psig and approximately 30 psig. When two expansion cylinders are used, the range of pressure within either cylinder (and thus the range of force produced by either cylinder) is reduced as the square root relative to the range of pressure (or force) experienced with a single expansion cylinder, e.g., from approximately 100:1 to approximately 10:1 (as set forth in the '853 application). Furthermore, as set forth in the '595 application, N appropriately sized cylinders can reduce an original operating pressure range R to $R^{1/N}$. Any group of N cylinders staged in this manner, where $N \geq 2$, is herein termed a cylinder group.

In various embodiments of the invention, the minimum or starting pressure within the inlet chambers of the cylinder group is increased (e.g., to a super-atmospheric pressure) in compression mode by a pre-compressor such as a blower (e.g., lobe-type or centrifugal-type). Increasing the minimum pressure typically decreases the range of pressures occurring within the cylinder group (and thus the range of forces exerted by the cylinder group). The pressure range is reduced in direct proportion to the degree of pre-compression. For example, for a pre-compressed inlet pressure of approximately 5 psig for a system with a maximum pressure of approximately 2,500 psig, the range of pressures is approximately 500:1 as opposed to approximately 2500:1 for an otherwise identical system having a 1 psig inlet pressure. Additionally, the mass of air in the inlet chamber at the initial pressure is increased in a pre-compressed system (relative to in a non-pre-compressed system) by the ratio of the absolute pressures (e.g., 20.7 pounds per square inch absolute (psia)/15.7 psia). Thus, if a single compression stroke takes the same amount of time in a system with pre-compression as in a system without pre-compression, a greater mass of compressed air at the output pressure (e.g., approximately 2,500 psig), representing a proportionately greater amount of stored energy, is produced in a given time interval. In other words, for a single complete compression by a given cylinder, higher compression power is achieved with pre-compression. Embodiments of the invention exhibit similar benefits when expanding gas down to a super-atmospheric pressure within one or more cylinder assemblies, and then expanding the gas to atmospheric pressure via an expander (e.g., a predominantly adiabatic expander).

All of the approaches described above for converting potential energy in compressed gas into mechanical and electrical energy may, if appropriately designed, be operated in reverse to store electrical energy as potential energy in a compressed gas. Since the accuracy of this statement will be apparent to any person reasonably familiar with the principles of electrical machines, power electronics, pneumatics, and the principles of thermodynamics, the operation of these mechanisms to both store energy and recover it from storage will not be described for each embodiment. Such operation is, however, contemplated and within the scope of the invention and may be straightforwardly realized without undue experimentation.

Embodiments of the invention may be implemented using any of the integrated heat-transfer systems and methods described in the '703 application and/or with the external heat-transfer systems and methods described in the '426 patent. In addition, the systems described herein, and/or other embodiments employing liquid-spray heat exchange or external gas heat exchange, may draw or deliver thermal energy via their heat-exchange mechanisms to external systems (not shown) for purposes of cogeneration, as described in U.S. patent application Ser. No. 12/690,513, filed Jan. 20, 2010 (the '513 application), the entire disclosure of which is incorporated by reference herein.

The compressed-air energy storage and recovery systems described herein are preferably "open-air" systems, i.e., systems that take in air from the ambient atmosphere for compression and vent air back to the ambient after expansion, rather than systems that compress and expand a captured volume of gas in a sealed container (i.e., "closed-air" systems). Thus, the systems described herein generally feature one or more cylinder assemblies for the storage and recovery of energy via compression and expansion of gas. The systems also include (i) a reservoir for storage of compressed gas after compression and supply of compressed gas for expansion thereof, and (ii) a vent for exhausting expanded gas to atmosphere after expansion and supply of gas for compression. The storage reservoir may include or consist essentially of, e.g., one or more one or more pressure vessels (i.e., containers for compressed gas that may have rigid exteriors or may be inflatable, and that may be formed of various suitable materials such as metal or plastic) or caverns (i.e., naturally occurring or artificially created cavities that are typically located underground). Open-air systems typically provide superior energy density relative to closed-air systems. As mentioned above, although in preferred embodiments the systems described herein are open-air systems, they preferably include pre-compression and/or post-expansion stages such that the air is not compressed and/or expanded within one or more cylinder assemblies over a pressure range extending to atmospheric pressure. Rather, preferred embodiments compress and/or expand gas within one or more cylinder assemblies over only a super-atmospheric pressure range (i.e., a range of pressures all of which are above atmospheric pressure).

Furthermore, the systems described herein may be advantageously utilized to harness and recover sources of renewable energy, e.g., wind and solar energy. For example, energy stored during compression of the gas may originate from an intermittent renewable energy source of, e.g., wind or solar energy, and energy may be recovered via expansion of the gas when the intermittent renewable energy source is nonfunctional (i.e., either not producing harnessable energy or producing energy at lower-than-nominal levels). As such, the systems described herein may be connected to, e.g., solar panels or wind turbines, in order to store the renewable energy generated by such systems.

In one aspect, embodiments of the invention feature a compressed-gas energy storage and recovery system including or consisting essentially of a cylinder assembly for compressing gas to store energy and/or expanding gas to recover energy, a heat-transfer subsystem for thermally conditioning gas in the cylinder assembly, thereby increasing efficiency of the energy storage and recovery, and, selectively fluidly connected to the cylinder assembly, a mechanism for substantially adiabatically compressing gas prior to its entry into the cylinder assembly and/or substantially adiabatically expanding gas after its exit from the cylinder assembly.

Embodiments of the invention may feature one or more of the following, in any of a variety of combinations. The thermal conditioning may render the compression and/or expansion in the cylinder assembly substantially isothermal. The compression and/or expansion in the cylinder assembly may be performed over a pressure range extending from a first super-atmospheric pressure to a second super-atmospheric pressure larger than the first super-atmospheric pressure. The mechanism may compress gas from approximately atmospheric pressure to approximately the first super-atmospheric pressure (e.g., approximately 1 psig, approximately 5 psig, or ranging between approximately 5 psig and approximately 15 psig). A pressure vessel for supplying gas at approximately the first super-atmospheric pressure may be fluidly coupled to the mechanism, thereby enabling the mechanism to operate continuously at approximately constant power. The system may include a second heat-transfer subsystem for thermally conditioning gas within the pressure vessel. The heat-transfer subsystem may include a circulation apparatus for circulating heat-transfer fluid through the cylinder assembly. The heat-transfer subsystem may include a mechanism (e.g., a spray head and/or a spray rod) disposed within the cylinder assembly for introducing the heat-transfer fluid. The heat-transfer subsystem may include or consist essentially of a heat exchanger and a circulation apparatus for circulating gas from the cylinder assembly through the heat exchanger and back to the cylinder assembly.

The system may include, selectively fluidly connected to the cylinder assembly, a compressed-gas reservoir for storage of gas after compression and supply of compressed gas for expansion thereof. A vent for exhausting expanded gas to atmosphere and supply of gas for compression thereof may be selectively fluidly connected to the mechanism. An intermittent renewable energy source (e.g., of wind or solar energy) may be connected to the cylinder assembly, energy stored during compression of gas may originate from the intermittent renewable energy source, and energy may be recovered via expansion of gas when the intermittent renewable energy source is nonfunctional. A movable boundary mechanism (e.g., a piston) may separate the cylinder assembly into two chambers. A crankshaft for converting reciprocal motion of the boundary mechanism into rotary motion may be mechanically coupled to the boundary mechanism. A motor/generator may be coupled to the crankshaft.

The mechanism may include or consist essentially of a bidirectional blower/expander. The mechanism may include or consist essentially of a discrete blower (e.g., of a type selected from the group consisting of lobe-type, centrifugal, and axial-turbine-type) and/or a discrete expander (e.g., of a type selected from the group consisting of centrifugal and axial-turbine-type). The mechanism may include or consist essentially of a discrete unidirectional blower and a discrete unidirectional expander. The compression and/or expansion in the cylinder assembly may be performed over a pressure range extending form a first super-atmospheric pressure to a second super-atmospheric pressure larger than the first super-atmospheric pressure. The blower may compress gas from approximately atmospheric pressure to approximately the first super-atmospheric pressure. The expander may expand gas from approximately the first super-atmospheric pressure to approximately atmospheric pressure.

The system may include, fluidly coupled to the blower, a first pressure vessel for supplying gas at approximately the first super-atmospheric pressure, thereby enabling the blower to operate continuously at approximately constant power. The system may include, fluidly coupled to the expander, a second pressure vessel for supplying gas at approximately the first super-atmospheric pressure, thereby enabling the expander to operate continuously at approximately constant power. The first pressure vessel may be different from the second pressure vessel. The system may include a control system for directing flow of gas between the cylinder assembly and the mechanism. The system may include a sensor for detecting pressure within the cylinder assembly and/or the mechanism, and the control system may be responsive to the sensor.

In another aspect, embodiments of the invention feature a method for energy storage and recovery. Within a cylinder assembly, gas is expanded and/or compressed between a first super-atmospheric pressure and a second super-atmospheric pressure larger than the first super-atmospheric pressure. The gas is thermally conditioned during the expansion and/or compression within the cylinder assembly. Gas is substantially adiabatically compressed from approximately atmospheric pressure to the first super-atmospheric pressure and/or substantially adiabatically expanded from the first super-atmospheric pressure to approximately atmospheric pressure.

Embodiments of the invention may feature one or more of the following, in any of a variety of combinations. The thermal conditioning may render the expansion and/or compression in the cylinder assembly substantially isothermal. The substantially adiabatic compression and/or the substantially adiabatic expansion may be performed external to the cylinder assembly. Thermally conditioning the gas may include or consist essentially of introducing a heat-transfer fluid within the cylinder assembly to exchange heat with the gas. The heat-transfer fluid may be circulated between the cylinder assembly and a heat exchanger to maintain the heat-transfer fluid at a substantially constant temperature. Thermally conditioning the gas may include or consist essentially of circulating gas from the cylinder assembly to an external heat exchanger and back to the cylinder assembly. Energy stored during compression of gas may originate from an intermittent renewable energy source (e.g., of wind or solar energy). Gas may be expanded to recover energy when the intermittent renewable energy source is nonfunctional.

Gas may be substantially adiabatically compressed by a discrete blower and/or substantially adiabatically expanded by a discrete expander. Gas may be substantially adiabatically compressed and/or substantially adiabatically expanded by a bidirectional blower/expander. Additional gas at the first super-atmospheric pressure may be supplied to enable the substantially adiabatic compression and/or the substantially adiabatic expansion to be performed continuously at approximately constant power. Gas may be compressed within the cylinder assembly, and thereafter, gas may be stored at approximately the second super-atmospheric pressure in a reservoir. Gas may be expanded substantially adiabatically, and thereafter, gas may be expanded at approximately atmospheric pressure to atmosphere. The cylinder assembly may include a movable boundary mechanism separating two chambers within the cylinder assembly. Reciprocal motion of the boundary mechanism may be converted into rotary motion, and/or rotary motion may be converted into reciprocal motion of the boundary mechanism.

These and other objects, along with advantages and features of the invention, will become more apparent through reference to the following description, the accompanying drawings, and the claims. Furthermore, it is to be understood that the features of the various embodiments described herein are not mutually exclusive and can exist in various combinations and permutations. Note that as used herein, the terms "pipe," "piping" and the like shall refer to one or more conduits that are rated to carry gas or liquid between two points. Thus, the singular term should be taken to include a plurality of parallel conduits where appropriate. "Super-atmospheric" pressure refers to a pressure larger than atmospheric pressure, and typically a pressure above approximately 1 psig, or even above approximately 5 psig (e.g., ranging between approximately 5 psig and approximately 15 psig). Herein, the terms "liquid" and "water" interchangeably connote any mostly or substantially incompressible liquid, the terms "gas" and "air" are used interchangeably, and the term "fluid" may refer to a liquid or a gas unless otherwise indicated. As used herein unless otherwise indicated, the term "substantially" means ±10%, and, in some embodiments, ±5%. A "valve" is any mechanism or component for controlling fluid communication between fluid paths or reservoirs, or for selectively permitting control or venting. The term "cylinder" refers to a chamber, of uniform but not necessarily circular cross-section, which may contain a slidably disposed piston or other mechanism that separates the fluid on one side of the chamber from that on the other, preventing fluid movement from one side of the chamber to the other while allowing the transfer of force/pressure from one side of the chamber to the next or to a mechanism outside the chamber. A "cylinder assembly" may be a simple cylinder or include multiple cylinders, and may or may not have additional associated components (such as mechanical linkages among the cylinders). The shaft of a cylinder may be coupled hydraulically or mechanically to a mechanical load (e.g., a hydraulic motor/pump or a crankshaft) that is in turn coupled to an electrical load (e.g., rotary or linear electric motor/generator attached to power electronics and/or directly to the grid or other loads), as described in the '595 and '853 applications.

BRIEF DESCRIPTION OF THE DRAWINGS

In the drawings, like reference characters generally refer to the same parts throughout the different views. Cylinders, rods, and other components are depicted in cross section in a manner that will be intelligible to all persons familiar with the art of pneumatic and hydraulic cylinders. Also, the drawings are not necessarily to scale, emphasis instead generally being placed upon illustrating the principles of the invention. In the following description, various embodiments of the present invention are described with reference to the following drawings, in which.

DETAILED DESCRIPTION

Figure 1:
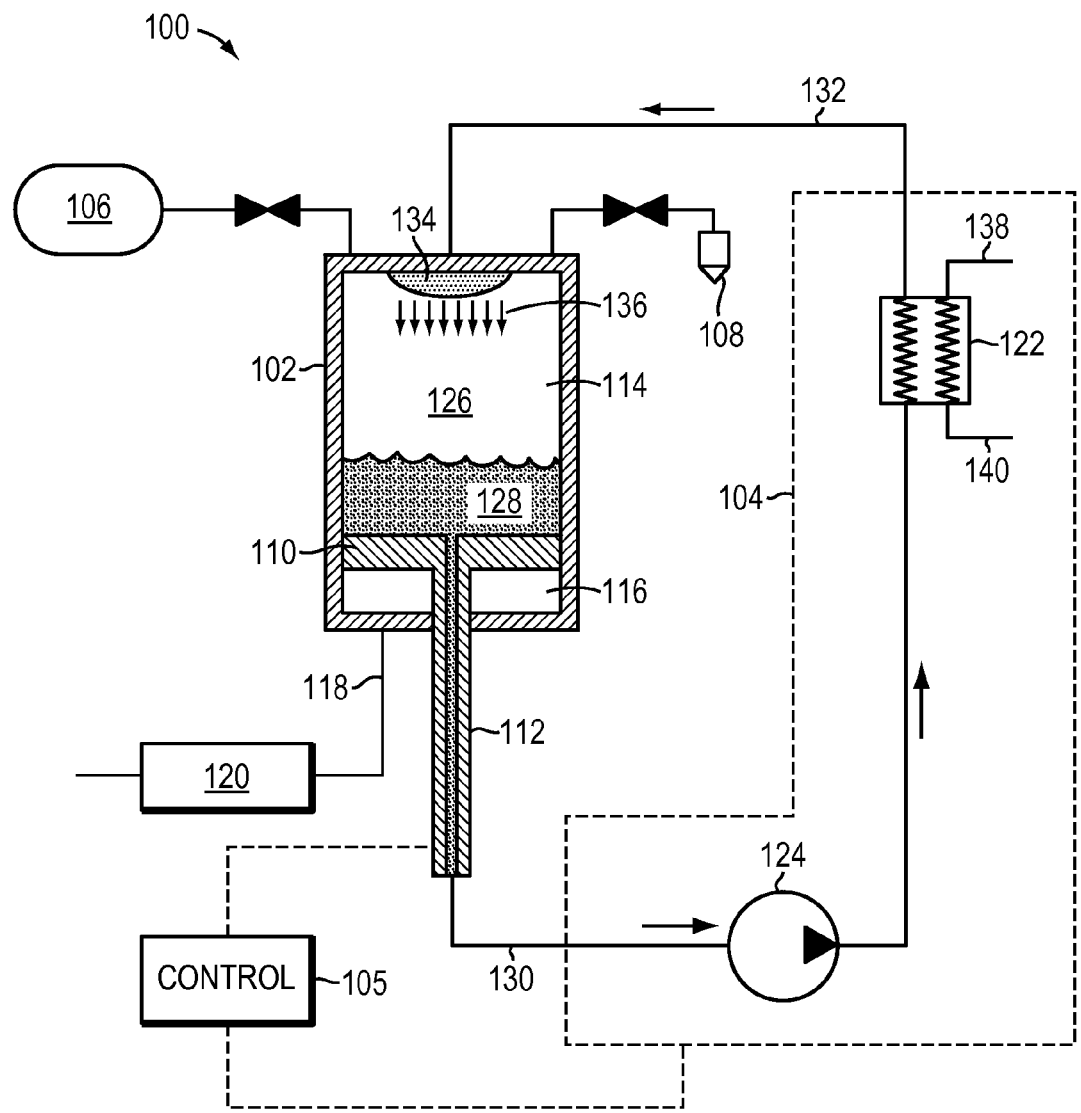
FIG. 1 is a schematic diagram of portions of a compressed-air energy storage and recovery system that may be utilized in conjunction with various embodiments of the invention.

FIG. 1 illustrates portions of a compressed air energy storage and recovery system 100 that may be adapted for use with embodiments of the present invention. The system 100 includes a cylinder assembly 102, a heat-transfer subsystem 104, and a control system 105 for controlling operation of the various components of system 100. During system operation, compressed air is either directed into storage reservoir 106 (e.g., one or more pressure vessels or caverns) during storage of energy or released from reservoir 106 during recovery of stored energy. Air is admitted to the system 100 through vent 108 during storage of energy, or exhausted from the system 100 through vent 108 during release of energy.

The control system 105 may be any acceptable control device with a human-machine interface. For example, the control system 105 may include a computer (for example a PC-type) that executes a stored control application in the form of a computer-readable software medium. More generally, control system 105 may be realized as software, hardware, or some combination thereof. For example, control system 105 may be implemented on one or more computers, such as a PC having a CPU board containing one or more processors such as the Pentium, Core, Atom, or Celeron family of processors manufactured by Intel Corporation of Santa Clara, Calif., the 680x0 and POWER PC family of processors manufactured by Motorola Corporation of Schaumburg, Ill., and/or the ATHLON line of processors manufactured by Advanced Micro Devices, Inc., of Sunnyvale, Calif. The processor may also include a main memory unit for storing programs and/or data relating to the methods described above. The memory may include random access memory (RAM), read only memory (ROM), and/or FLASH memory residing on commonly available hardware such as one or more application specific integrated circuits (ASIC), field programmable gate arrays (FPGA), electrically erasable programmable read-only memories (EEPROM), programmable read-only memories (PROM), programmable logic devices (PLD), or read-only memory devices (ROM). In some embodiments, the programs may be provided using external RAM and/or ROM such as optical disks, magnetic disks, or other storage devices.

For embodiments in which the functions of controller 105 are provided by software, the program may be written in any one of a number of high level languages such as FORTRAN, PASCAL, JAVA, C, C++, C#, LISP, PERL, BASIC or any suitable programming language. Additionally, the software can be implemented in an assembly language and/or machine language directed to the microprocessor resident on a target device.

The control system 105 may receive telemetry from sensors monitoring various aspects of the operation of system 100 (as described below), and may provide signals to control valve actuators, valves, motors, and other electromechanical/electronic devices. Control system 105 may communicate with such sensors and/or other components of system 100 via wired or wireless communication. An appropriate interface may be used to convert data from sensors into a form readable by the control system 105 (such as RS-232 or network-based interconnects). Likewise, the interface converts the computer's control signals into a form usable by valves and other actuators to perform an operation. The provision of such interfaces, as well as suitable control programming, is clear to those of ordinary skill in the art and may be provided without undue experimentation.

The cylinder assembly 102 includes a piston 110 (or other suitable boundary mechanism) slidably disposed therein with a center-drilled rod 112 extending from piston 110 and preferably defining a fluid passageway. The piston 110 divides the cylinder assembly 102 into a first chamber (or "compartment") 114 and a second chamber 116. The rod 112 may be attached to a mechanical load, for example, a crankshaft or hydraulic system. Alternatively or in addition, the second chamber 116 may contain hydraulic fluid that is coupled through other pipes 118 and valves to a hydraulic system 120 (which may include, e.g., a hydraulic motor/pump and an electrical motor/generator). The heat-transfer subsystem 104 includes or consists essentially of a heat exchanger 122 and a booster-pump assembly 124.

At any time during an expansion or compression phase of gas within the first or upper chamber 114 of the cylinder assembly 102, the chamber 114 will typically contain a gas 126 (e.g., previously admitted from storage reservoir 106 during the expansion phase or from vent 108 during the compression phase) and (e.g., an accumulation of) heat-transfer fluid 128 at substantially equal pressure $P_s$ (e.g., up to approximately 3,000 psig). The heat-transfer fluid 128 may be drawn through the center-drilled rod 112 and through a pipe 130 by the pump 124. The pump 124 raises the pressure of the heat-transfer fluid 128 to a pressure $P_i'$ (e.g., up to approximately 3,015 psig) somewhat higher than $P_s$, as described in U.S. patent application Ser. No. 13/009,409, filed on Jan. 19, 2011 (the '409 application), the entire disclosure of which is incorporated by reference herein. The heat-transfer fluid 128 is then sent through the heat exchanger 122, where its temperature is altered, and then through a pipe 132 to a spray mechanism 134 disposed within the cylinder assembly 102. In various embodiments, when the cylinder assembly 102 is operated as an expander, a spray 136 of the heat-transfer fluid 128 is introduced into the cylinder assembly 102 at a higher temperature than the gas 126 and, therefore, transfers thermal energy to the gas 126 and increases the amount of work done by the gas 126 on the piston 110 as the gas 126 expands. In an alternative mode of operation, when the cylinder assembly 102 is operated as a compressor, the heat-transfer fluid 128 is introduced at a lower temperature than the gas 126. Control system 105 may enforce substantially isothermal operation, i.e., expansion and/or compression of gas in cylinder assembly 102, via control over, e.g., the introduction of gas into and the exhausting of gas out of cylinder assembly 102, the rates of compression and/or expansion, and/or the operation of heat-transfer subsystem 104 in response to sensed conditions. For example, control system 105 may be responsive to one or more sensors disposed in or on cylinder assembly 102 for measuring the temperature of the gas and/or the heat-transfer fluid within cylinder assembly 102, responding to deviations in temperature by issuing control signals that operate one or more of the system components noted above to compensate, in real time, for the sensed temperature deviations. For example, in response to a temperature increase within cylinder assembly 102, control system 105 may issue commands to increase the flow rate of spray 136 of heat-transfer fluid 128.

The circulating system 124 described above will typically have higher efficiency than a system which pumps liquid from a low intake pressure (e.g., approximately 0 psig) to $P_i'$, as detailed in the '409 application.

Furthermore, embodiments of the invention may be applied to systems in which chamber 114 is in fluid communication with a pneumatic chamber of a second cylinder (rather than with reservoir 106). That second cylinder, in turn, may communicate similarly with a third cylinder, and so forth. Any number of cylinders may be linked in this way. These cylinders may be connected in parallel or in a series configuration, where the compression and expansion is done in multiple stages.

The fluid circuit of heat exchanger 122 may be filled with water, a coolant mixture, and/or any acceptable heat-transfer medium. In alternative embodiments, a gas, such as air or refrigerant, is used as the heat-transfer medium. In general, the fluid is routed by conduits to a large reservoir of such fluid in a closed or open loop. One example of an open loop is a well or body of water from which ambient water is drawn and the exhaust water is delivered to a different location, for example, downstream in a river. In a closed-loop embodiment, a cooling tower may cycle the water through the air for return to the heat exchanger. Likewise, water may pass through a submerged or buried coil of continuous piping where a counter heat-exchange occurs to return the fluid flow to ambient temperature before it returns to the heat exchanger for another cycle.

In various embodiments, the heat-exchange fluid is conditioned (i.e., pre-heated and/or pre-chilled) or used for heating or cooling needs by connecting the fluid inlet 138 and fluid outlet 140 of the external heat exchange side of the heat exchanger 122 to an installation (not shown), such as a heat-engine power plant, an industrial process with waste heat, a heat pump, and/or a building needing space heating or cooling, as described in the '513 application. The installation may be a large water reservoir that acts as a constant-temperature thermal fluid source for use with the system. Alternatively, the water reservoir may be thermally linked to waste heat from an industrial process or the like, as described above, via another heat exchanger contained within the installation. This allows the heat-transfer fluid to acquire or expel heat from/to the linked process, depending on configuration, for later use as a heating/cooling medium in the compressed air energy storage/conversion system.

Figure 2:
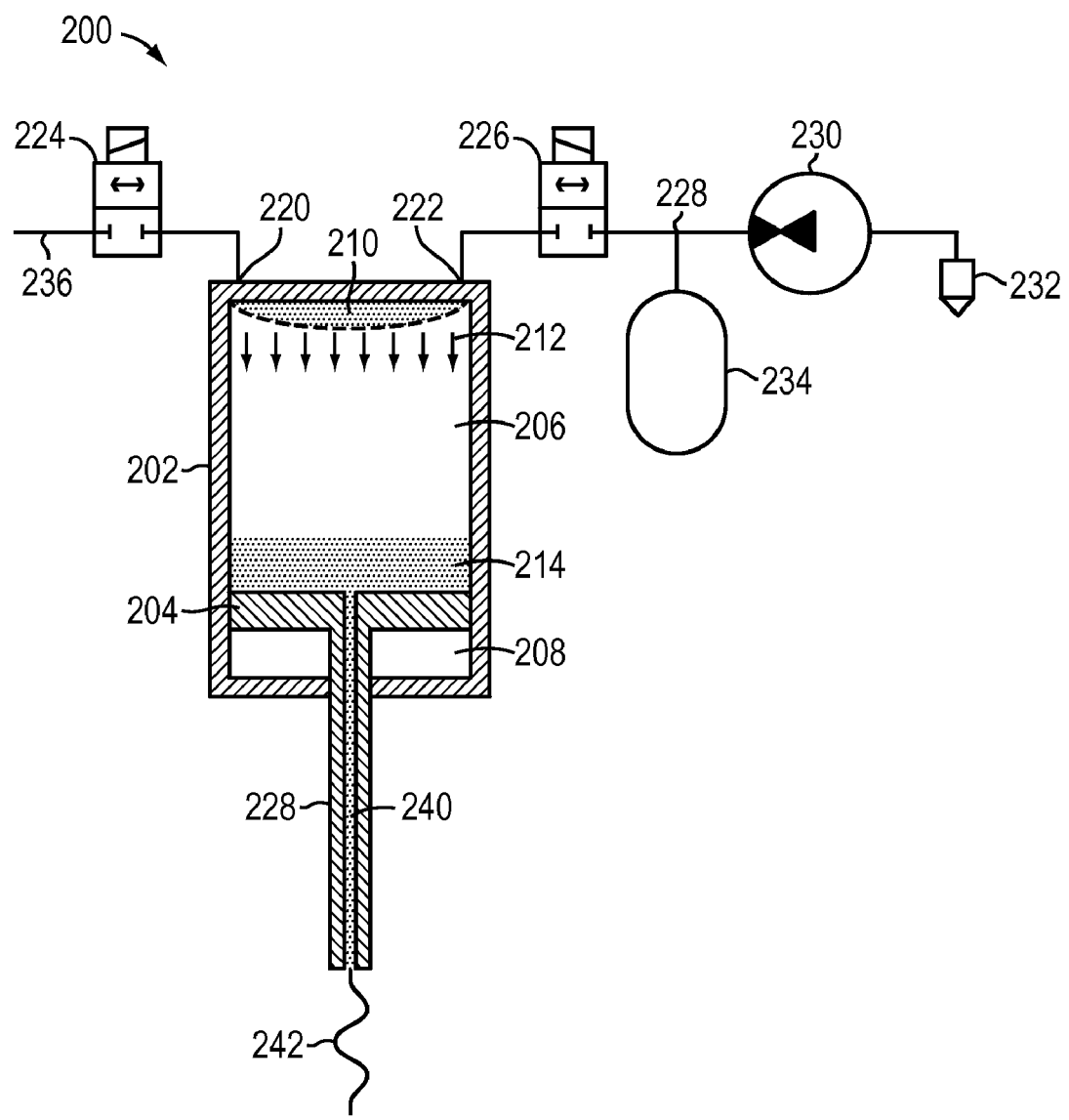
FIGS. 2 and 3 are schematic drawings of embodiments of a stage of a pneumatic expander-compressor in accordance with various embodiments of the invention.

FIG. 2 depicts an illustrative system 200 that substantially isothermally compresses or expands gas over a predetermined pressure range in accordance with various embodiments of the present invention. System 200 includes a cylinder 202 containing a mobile piston 204 (or other suitable boundary mechanism) that divides the interior of the cylinder 202 into a gas-filled (pneumatic) chamber 206 and a liquid-filled (hydraulic) chamber 208. Alternatively, both chambers 206 and 208 may be gas-filled. An integrated heat exchange mechanism is typically present in chambers 206 and/or 208, as described in the '703 application and '426 patent, and/or as shown in FIG. 1. In the illustrative embodiment shown in FIG. 2, a spray head 210 injects a spray 212 of liquid droplets into the upper chamber 206 of the cylinder 202. This spray 212 may produce an accumulation of liquid 214 on top of piston 204. Ports 220 and 222 with valves 224 and 226 allow gas to be admitted to or exhausted from chamber 206 as desired. A port or ports (not shown) with associated pipes and valves (not shown) allows fluid to be admitted to or withdrawn from chamber 208 as desired.

During air expansion, the gas in chamber 206 expands, performing work on piston 204. As the gas in chamber 206 expands, its temperature tends to fall. If during expansion the spray 212 enters chamber 206 at a suitable temperature (e.g., the temperature of the gas in chamber 206 before compression begins), then the spray 212 is at a higher temperature during expansion than the gas in chamber 206, and the spray 212 transfers thermal energy to the gas in chamber 206. The transfer of thermal energy from the spray 212 to the gas in chamber 206 increases the amount of work performed by the expanding gas on the piston 204. In effect, the transfer of thermal energy from the spray 212 to the gas in chamber 206 allows the conversion into work of some of the thermal energy in the spray 212.

During air compression, piston 204 moves upward and thus compresses the gas in chamber 206. While the gas in chamber 206 is being compressed by the piston 204, its temperature tends to rise. If during compression the liquid spray 212 enters chamber 206 at a suitable temperature (e.g., the temperature of the gas in chamber 206 before compression begins), then the gas in chamber 206 will be at a higher temperature during compression than the spray 212, and the gas in chamber 206 will transfer thermal energy to the spray 212. The transfer of thermal energy to the spray 212 from the gas in chamber 206 reduces the amount of work that the piston 204 performs on the gas in chamber 206 in order to compress the gas.

To prepare the cylinder 202 for compression, low-pressure gas is admitted from point 228 through valve 226 and port 222 into upper chamber 206 during a downward stroke starting with piston 204 near or at the top of cylinder 202. In various embodiments of the invention, the inlet pressure at point 228 is raised above atmospheric pressure by a blower 230 (e.g., lobe-type, centrifugal-type, or axial-turbine-type blower) that draws in atmospheric-pressure or near-atmospheric-pressure gas through inlet/vent 232. The compression by blower 230 may be predominantly adiabatic, such as is achieved by a lobe-type, centrifugal, or axial-turbine-type blower. As shown in FIG. 2, the blower 230 may be a bidirectional expander/compressor; hence, references herein to blower 230 and expander 230 below may refer to a single bidirectional unit. The outlet of the blower 230 may include an after-cooler or other heat-exchange system (not shown) and may be attached to a low-pressure vessel 234 near or at the predetermined minimum system pressure at point 228 (i.e., the super-atmospheric pressure enabled by the blower 230 and that serves as the inlet pressure to cylinder 202) in order to provide a buffer such that the blower 230 may operate continuously at near-constant power. The low-pressure vessel 234 may contain integrated heat exchange as described in the '703 and '513 applications. At or near the bottom of a downward (intake) stroke preparatory to compression, where piston 204 is at or near the bottom of cylinder 202 and chamber 206 is filled with gas at a predetermined pressure by the action of blower 230 and valve 226, valve 226 is closed. An upward compression stroke follows. At a predetermined high pressure, which may be equal to the pressure at point 236 (e.g., the pressure in a high-pressure storage vessel like reservoir 106 or higher-pressure cylinder in a multi-stage system), valve 224 is opened, connecting chamber 206 through port 220 to point 236. The pressurized gas is then forced through valve 224 to point 236, until piston 204 is near or at the top of cylinder 206, whereupon valve 224 closes and the process repeats with another intake stroke.

In comparison to a system otherwise identical to system 200 but lacking a blower 230, the presence of the blower 230 in system 200 enables a greater amount (mass) of gas to be compressed in a single upstroke of piston 204 within cylinder 202. The work of compression done in a single stroke with blower 230 is higher than without blower 230 and more gas is compressed to point 236.

The efficiency of the total compression for predominantly adiabatic compression by blower 230 and predominantly isothermal compression in the cylinder 202 is typically less than a near-isothermal compression completely within the cylinder 202 over the entire pressure range, as previously mentioned. The addition of the blower 230 thus generally increases the power of system 200 (i.e., the rate at which system 200 transforms work to potential energy of compressed gas) at the expense of efficiency. The degree of tradeoff between power and efficiency that is optimal typically varies depending on the application in which system 200 is used. Additionally, for a given outlet pressure at port 220, the higher starting pressure within chamber 206 of the cylinder 202 reduces the pressure range (ratio of outlet pressure to inlet pressure) over which the cylinder 202 acts during the course of a stroke—as reviewed above, this also narrows the range of forces that act on rod 238 that is attached to the piston 204 and whose nether end extends out of cylinder 202. This narrowing of the range of forces in turn enables more efficient conversion of electrical energy by a motor/generator (not shown) to work in the system 200, as previously discussed.

During an expansion, heat-exchange liquid 214 on top of piston 204 may be evacuated from chamber 206 through a channel 240 center-drilled through rod 238. (In the figures, heat-exchange liquid 214 is indicated by stippling.) A flexible hose 242 conveys the liquid 214 from the nether end of center-drilled channel 240 through piping to a pump and heat exchanger (e.g., as shown in FIG. 1) before re-injection into the upper chamber 206 as a spray 212.

During an expansion, a predetermined amount of compressed gas at high pressure is admitted from point 236 (e.g., from a storage vessel such as reservoir 106 or higher-pressure cylinder in a multi-stage system) through valve 224 and port 220 into chamber 206. The amount of gas admitted may be set by the control system 105 such that after fully expanding on a downward stroke (i.e., when piston 204 reaches the bottom of cylinder 202), the gas reaches a predetermined minimum system pressure that is typically super-atmospheric (e.g., approximately 5 psig). For example, control system 105 may be responsive to one or more sensors measuring gas flow rate and/or pressure within cylinder 202 to meter the gas introduction. On the upward return stroke of the cylinder 202, that gas is exhausted through valve 226 to point 228.

In various embodiments of the invention, the piping at point 228 is attached to an expander 230 that converts the pressurized gas flow into rotational motion; in such embodiments, gas flow through the expander 230 generates power additional to the amount generated by the expansion within the cylinders. The expansion through the expander 230 may be predominantly adiabatic, such as that achieved by a centrifugal or axial-turbine-type expander. After expansion through the expander 230, the gas may be exhausted to the atmosphere through vent 232. In addition, as shown in FIG. 2, a low-pressure vessel 234 near or at the predetermined minimum system pressure (i.e., the super-atmospheric pressure input to the expander 230 and that serves as the outlet pressure of cylinder 202) may also be connected at point 228 in order to provide a buffer such that the expander 230 may operate continuously at near-constant power. As mentioned above, the low-pressure vessel 234 may contain an integrated heat exchanger.

By ending the expansion stroke within cylinder 202 at a pressure above atmospheric pressure, a greater amount (mass) of gas may be expanded in a single downstroke of piston 204 within cylinder 202. The work of expansion done in that single stroke (higher forces acting over a distance) will be higher than the amount of work performed by an otherwise identical stroke during which a smaller amount of gas is expanded (lower forces acting over the same distance). Moreover, if an expander 230 is employed, additional power may be generated that would be lost if the super-atmospheric-pressure gas in chamber 206 at the end of an expansion stroke were vented directly to the atmosphere. The total efficiency of a predominantly adiabatic expansion in expander 230 combined with a predominantly isothermal expansion in cylinder 202 is typically less than the efficiency of a near-isothermal expansion completely within the cylinder 202 over the entire pressure range. The employment of super-atmospheric venting pressure combined with an expander 230 thus generally adds power at the expense of efficiency. The degree of tradeoff between power and efficiency that is optimal typically varies depending on the application in which system 200 is used. Additionally, the higher vent pressure of the cylinder 202 reduces the pressure range over which the cylinder 202 acts for a given outlet pressure (i.e., where range is outlet/inlet pressure), such that some benefit of efficiency of power transmission may be achieved by operating the cylinder 202 over a narrower pressure (and thus force) range.

Control system 105 may control the blower/expander 230 and cylinder 202 in order to enforce substantially isothermal expansion and/or compression of gas in cylinder 202 over a particular range of super-atmospheric pressures and substantially adiabatic compression and/or expansion in blower/expander 230 between approximately atmospheric pressure and the minimum super-atmospheric pressure of operation of cylinder 202. For example, control system 105 may direct the introduction of gas into and the exhausting of gas out of cylinder 202 and blower/expander 230 via, e.g., control over the various ports and/or valves associated with these components. Control system 105 may be responsive to one or more sensors disposed in or on cylinder 202 and/or blower/expander 230 for measuring the pressure of the gas within these components, and direct movement of the gas within system 200 accordingly. As described above, control of substantially isothermal compression and/or expansion within cylinder 202 may also entail control over an associated heat-transfer subsystem (e.g., heat-transfer subsystem 104) and/or other system for thermally conditioning the gas. Such heat-transfer subsystems may be turned off or rendered idle during substantially adiabatic compression and/or expansion in blower/expander 230.

Figure 3:
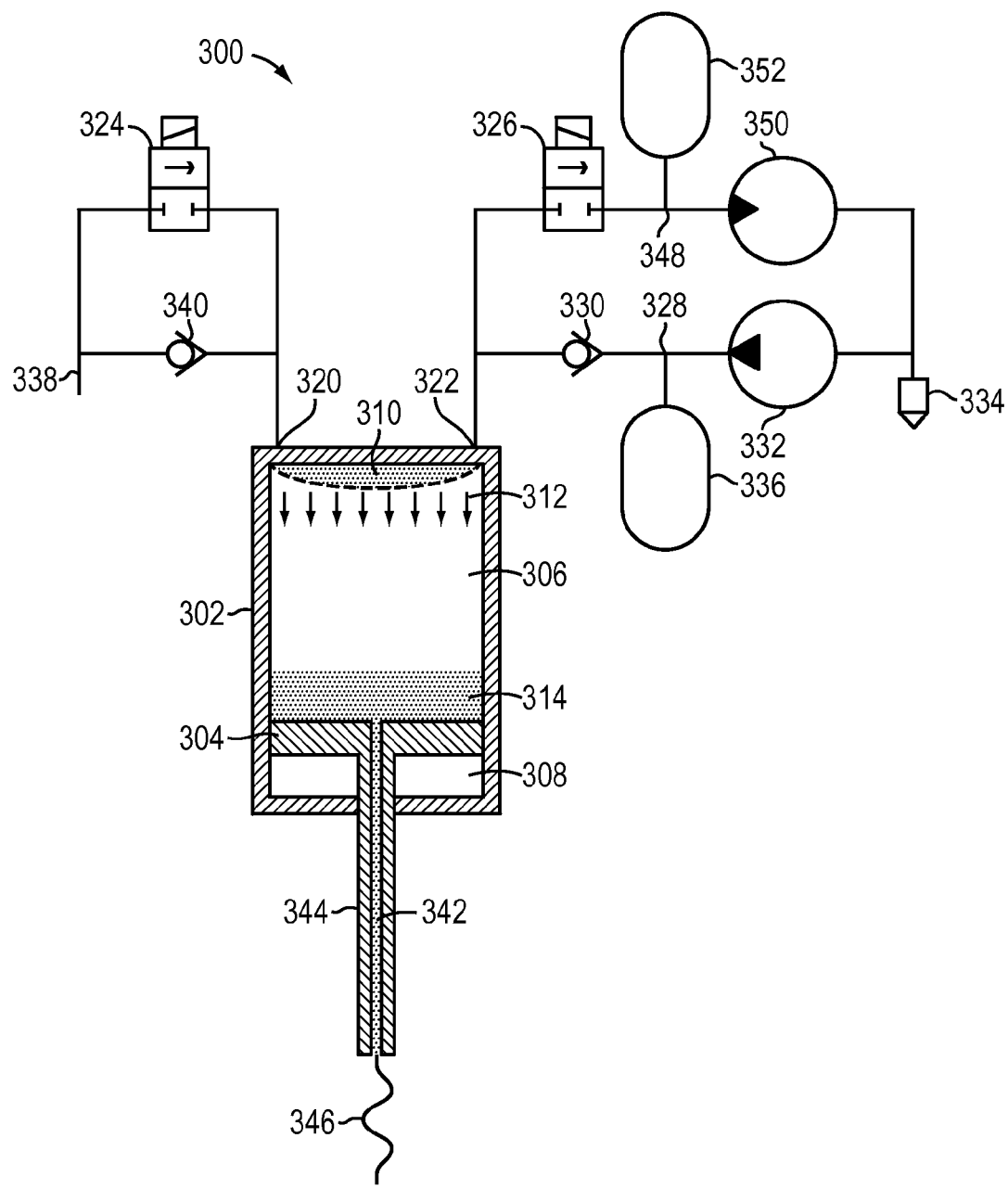

FIG. 3 depicts an illustrative system 300 that substantially isothermally compresses or expands gas over a predetermined pressure range in accordance with various embodiments of the present invention. System 300 employs the same substantially isothermal cylinder stage shown in system 200 of FIG. 2, but features a separate and parallel set of control valves and other components for expansion and compression. System 300 includes a cylinder 302 containing a mobile piston 304 that divides the interior of the cylinder 302 into a gas-filled (pneumatic) chamber 306 and a liquid-filled (hydraulic) chamber 308. Alternatively, both chambers 306 and 308 may be gas-filled. An integrated heat exchange mechanism may be present in chambers 306 and/or 308, as described in the '703 application and the '426 patent, and/or as shown in FIG. 1. In the illustrative embodiment, a spray head 310 injects a spray 312 of liquid droplets into the upper chamber 306 of the cylinder 302. This spray 312 may produce an accumulation of liquid 314 on top of piston 304. Ports 320 and 322 with valves 324 and 326 allow gas to be admitted to or exhausted from chamber 306 as desired. A port or ports (not shown) with associated pipes and valves (not shown) allows fluid to be admitted to or withdrawn from chamber 308 as desired.

During air expansion, gas in chamber 306 expands, performing work on piston 304. As the gas in chamber 306 expands, its temperature tends to fall. If during expansion the spray 312 enters chamber 306 at a suitable temperature (e.g., the temperature of the gas in chamber 306 before compression begins), then the spray 312 is at a higher temperature during expansion than the gas in chamber 306, and the spray 312 transfers thermal energy to the gas in chamber 306. The transfer of thermal energy from the spray 312 to the gas in chamber 306 increases the amount of work performed by the expanding gas on the piston 304. In effect, this transfer of thermal energy from the spray 312 to the gas in chamber 306 enables the conversion of some of the thermal energy in the spray 312 into work.

During air compression, piston 304 moves upward and thus compresses the gas in chamber 306. While the gas in chamber 306 is being compressed by the piston 304, its temperature tends to rise. If during compression the liquid spray 312 enters chamber 306 at a suitable temperature (e.g., the temperature of the gas in chamber 306 before compression begins), then the gas in chamber 306 is at a higher temperature during compression than the spray 312, and the gas in chamber 306 transfers thermal energy to the spray 312. The transfer of thermal energy to the spray 312 from the gas in chamber 306 reduces the amount of work that the piston 304 must perform on the gas in chamber 306 in order to compress the gas.

During a downward stroke (preparatory to a compression stroke) starting with piston 304 near or at the top of cylinder 302, low-pressure gas is admitted from point 328 through valve 330 (shown here as a check valve) and through port 322 into upper chamber 306. In various embodiments of the invention, the inlet pressure at point 328 is raised above atmospheric pressure by a blower 332 (e.g., lobe-type, centrifugal-type, axial-turbine-type blower) drawing in atmospheric or near-atmospheric pressure gas through inlet/vent 334. The compression by blower 332 may be predominantly adiabatic such as that achieved by a lobe-type, centrifugal, or axial-turbine-type blower. As shown in the illustrative example, the blower 332 need not be a bidirectional expander/compressor, but may be implemented as a unidirectional blower that may be turned off or rendered idle during expansion mode. The outlet of the blower 332 may include an after-cooler or other heat-exchange system (not shown) and may be attached to a low-pressure vessel 336 near or at the predetermined minimum system pressure at point 328 in order to provide a buffer such that the blower 332 may operate continuously at substantially constant power during compression mode. The low-pressure vessel 336 may contain integrated heat exchange as described in the '703 and '513 applications. At or near the bottom of a downward stroke, where piston 304 is at or near the bottom of cylinder 302, chamber 306 is filled with gas at the predetermined pressure by the action of blower 332 and valve 330, valve 330 is closed and an upward compression stroke is performed. Alternatively, as shown, valve 330 operates as a check valve and closes as soon as the upward compression stroke pressurizes chamber 206 above the pressure at point 328. At a predetermined high pressure, preferably equal to the pressure at point 338 (e.g., from a storage vessel such as reservoir 106 or a higher-pressure cylinder in a multi-stage system), valve 340 (shown here as a check valve) is opened, connecting chamber 306 through port 320 to point 338. The pressurized gas is then forced through valve 320 to point 338, until piston 304 is near or at the top of cylinder 306, when valve 320 closes and the process repeats with another intake stroke. Alternatively, as shown in FIG. 3, valve 340 operates as a check valve and opens as soon as the upward compression stroke pressurizes chamber 306 above the pressure at point 338 and closes as soon as the downward intake stroke begins, reducing pressure in chamber 306 below the pressure at point 338.

Using the blower 332, a greater amount (mass) of gas may be compressed in a single upstroke of piston 304 within cylinder 302 than may be compressed without using blower 332. The work of compression done in that single stroke will be higher than without blower 332 and more gas will be compressed to point 338. The efficiency of the total compression for a predominantly adiabatic compression in blower 332 and a predominantly isothermal compression in cylinder 302 tends to be less than for a substantially isothermal compression completely within the cylinder 302 over the entire pressure range. The addition of the blower 332 thus typically adds power at the expense of efficiency. Additionally, the higher super-atmospheric starting pressure within the cylinder 302 reduces the pressure range over which the cylinder 302 acts for a given outlet pressure (i.e. where range is outlet/inlet pressure), such that some benefit of efficiency of power transmission may be achieved by operating the cylinder 302 over a narrower pressure (and thus force) range.

During an expansion, heat-exchange liquid 314 on top of piston 304 may be evacuated from chamber 306 through a channel 342 center-drilled through a rod 344 that is attached to the piston 304 and whose nether end extends out of cylinder 302. A flexible hose 346 may convey the liquid 314 from the nether end of center-drilled channel 342 to a pump and heat exchanger through piping (as depicted in FIG. 1) before injection into the upper chamber 306 as a spray 312.

During expansion, a predetermined amount of compressed gas at high pressure is admitted from point 338 (e.g. from a storage vessel such as reservoir 106 or higher-pressure cylinder in a multi-stage system) through valve 324 and port 320 into chamber 306. As illustrated in FIG. 3, valve 324 may be a unidirectional valve, i.e., optimized for flow in only one direction. The amount of gas admitted may be set by the control system 105 such that after fully expanding on a downward stroke (i.e. piston 304 reaches the bottom of cylinder 302) the gas reaches the predetermined minimum system pressure for cylinder compression and/or expansion (e.g. approximately 5 psig). On the upward return stroke of the cylinder 302, that gas is exhausted through valve 326 to point 348. In various embodiments of the invention, point 348 may be attached to an expander 350 that converts the pressurized gas flow to rotational motion, performing work and generating additional power above the amount generated by the expansion within the cylinder(s). As shown in the illustrative example, the expander 350 need not be a bidirectional expander/compressor, but may be implemented as a unidirectional expander that may be turned off or rendered idle during compression mode. The expansion through the expander 350 may be predominantly adiabatic such as that achieved by a centrifugal or axial-turbine-type expander. After expansion through the expander 350, the gas may be exhausted to atmosphere through vent 334. In addition, as shown in this illustrative embodiment, a low-pressure vessel 352 near or at the predetermined minimum system pressure may also be connected at point 348 in order to provide a buffer such that the expander 350 may operate continuously at substantially constant power. The low-pressure vessel 352 may contain integrated heat exchange as described in the '703 and '513 applications.

By ending the expansion stroke within cylinder 302 at a pressure above atmospheric pressure, a greater amount (mass) of gas may be expanded in a single downstroke of piston 304 within cylinder 302. The work of expansion done in that single stroke is typically higher than that done with less gas. Additionally, with an expander 350, additional power may be generated that would be lost if the super-atmospheric-pressure gas were vented directly to atmosphere. The efficiency of the total expansion for a predominantly adiabatic expansion in expander 350 and a predominantly isothermal expansion in cylinder 302 may be less than a substantially isothermal expansion completely within the cylinder 302 over the entire pressure range. The addition of the higher vent pressure thus typically adds power at the expense of efficiency. The degree of tradeoff between power and efficiency that is optimal typically varies depending on the application in which system 300 is used. (For example, at certain low pressures, the cost of an expander may not be worth the recovered power; in such a case, vessel 352 and expander 350 may be profitably omitted.) Additionally, the higher vent pressure of the cylinder 302 typically reduces the pressure range over which the cylinder 302 acts for a given outlet pressure; as a result, the benefit of efficiency of power transmission may be achieved by operating the cylinder 302 over a narrower pressure (and thus force) range.

Additionally, the higher vent pressure at port 322 reduces the pressure range (ratio of outlet pressure to inlet pressure) over which the cylinder 302 acts during the course of a stroke—this also narrows the range of forces that act on rod 344. This narrowing of the range of forces in turn enables more efficient conversion of work performed by system 300 to electrical energy by a motor/generator (not shown).

The pneumatic cylinders shown herein may be outfitted with an external gas heat exchanger instead of or in addition to liquid sprays. An external gas heat exchanger may also allow expedited heat transfer to or from the high-pressure gas being expanded (or compressed) in the cylinders. Such methods and systems for isothermal gas expansion (or compression) using an external heat exchanger are shown and described in the '426 patent.

Generally, the systems described herein may be operated in both an expansion mode and in the reverse compression mode as part of a full-cycle energy storage system with high efficiency. For example, the systems may be operated as both compressor and expander, storing electricity in the form of the potential energy of compressed gas and producing electricity from the potential energy of compressed gas. Alternatively, the systems may be operated independently as compressors or expanders.

The terms and expressions employed herein are used as terms of description and not of limitation, and there is no intention, in the use of such terms and expressions, of excluding any equivalents of the features shown and described or portions thereof, but it is recognized that various modifications are possible within the scope of the invention claimed.

What is claimed is:

1. A compressed-gas energy storage and recovery system comprising:
   a cylinder assembly for at least one of compressing gas to store energy or expanding gas to recover energy;
   a heat-transfer subsystem for thermally conditioning gas in the cylinder assembly, thereby increasing efficiency of the energy storage and recovery;
   selectively fluidly connected to the cylinder assembly, a mechanism for at least one of (i) substantially adiabatically compressing gas prior to its entry into the cylinder assembly, or (ii) substantially adiabatically expanding gas after its exit from the cylinder assembly;
   selectively fluidly connected to the cylinder assembly, a compressed-gas reservoir for at least one of storage of gas after compression or supply of compressed gas for expansion thereof; and
   selectively fluidly connected to the mechanism, a vent for at least one of exhausting expanded gas to atmosphere or supply of gas for compression thereof.

2. The system of claim 1, wherein the thermal conditioning renders the at least one of compression or expansion in the cylinder assembly substantially isothermal.

3. The system of claim 1, wherein the at least one of compression or expansion in the cylinder assembly is performed over a pressure range extending from a first super-atmospheric pressure to a second super-atmospheric pressure larger than the first super-atmospheric pressure.

4. The system of claim 3, wherein the mechanism compresses gas from approximately atmospheric pressure to approximately the first super-atmospheric pressure.

5. The system of claim 3, wherein the mechanism expands gas from approximately the first super-atmospheric pressure to approximately atmospheric pressure.

6. The system of claim 3, wherein the first super-atmospheric pressure is approximately 5 psig.

7. The system of claim 1, wherein the heat-transfer subsystem comprises a circulation apparatus for circulating heat-transfer fluid through (i) into the cylinder assembly, thereby introducing the heat-transfer fluid into the gas, and (ii) out of the cylinder assembly.

8. The system of claim 1, further comprising, connected to the cylinder assembly, an intermittent renewable energy source of wind or solar energy, wherein (i) energy stored during compression of gas originates from the intermittent renewable energy source, and (ii) energy is recovered via expansion of gas when the intermittent renewable energy source is nonfunctional.

9. The system of claim 1, further comprising a movable boundary mechanism separating the cylinder assembly into two chambers.

10. The system of claim 9, further comprising a crankshaft (i) mechanically coupled to the boundary mechanism, and (ii) for converting reciprocal motion of the boundary mechanism into rotary motion.

11. The system of claim 1, wherein the mechanism comprises a bidirectional blower/expander.

12. The system of claim 1, wherein the mechanism comprises at least one of a discrete blower or a discrete expander.

13. The system of claim 12, wherein the mechanism comprises a blower of a type selected from the group consisting of lobe-type, centrifugal, and axial-turbine-type.

14. The system of claim 12, wherein the mechanism comprises an expander of a type selected from the group consisting of centrifugal and axial-turbine-type.

15. The system of claim 1, further comprising a control system for directing flow of gas between the cylinder assembly and the mechanism.

16. The system of claim 15, further comprising a sensor for detecting a pressure within at least one of the cylinder assembly or the mechanism, wherein the control system is responsive to the sensor.

17. A compressed-gas energy storage and recovery system comprising:
 a cylinder assembly for at least one of compressing gas to store energy or expanding gas to recover energy;
 a heat-transfer subsystem for thermally conditioning gas in the cylinder assembly, thereby increasing efficiency of the energy storage and recovery;
 selectively fluidly connected to the cylinder assembly, a mechanism for at least one of (i) substantially adiabatically compressing gas prior to its entry into the cylinder assembly, or (ii) substantially adiabatically expanding gas after its exit from the cylinder assembly; and
 fluidly coupled to the mechanism, a pressure vessel for supplying gas at approximately the first super-atmospheric pressure, thereby enabling the mechanism to operate continuously at approximately constant power.

18. The system of claim 17, further comprising a second heat-transfer subsystem for thermally conditioning gas within the pressure vessel.

19. A compressed-gas energy storage and recovery system comprising:
 a cylinder assembly for at least one of compressing gas to store energy or expanding gas to recover energy;
 a heat-transfer subsystem for thermally conditioning gas in the cylinder assembly, thereby increasing efficiency of the energy storage and recovery; and
 selectively fluidly connected to the cylinder assembly, a mechanism for at least one of (i) substantially adiabatically compressing gas prior to its entry into the cylinder assembly, or (ii) substantially adiabatically expanding gas after its exit from the cylinder assembly,
 wherein the heat-transfer subsystem comprises (i) a circulation apparatus for circulating heat-transfer fluid through the cylinder assembly, and (ii) a mechanism disposed within the cylinder assembly for introducing the heat-transfer fluid into the gas.

20. The system of claim 19, wherein the mechanism for introducing the heat-transfer fluid comprises at least one of a spray head or a spray rod.

* * * * *